United States Patent
Liu et al.

(10) Patent No.: US 9,314,712 B2
(45) Date of Patent: Apr. 19, 2016

(54) FUNCTIONALIZED SUBSTRATES WITH ION-EXCHANGE PROPERTIES

(75) Inventors: Xiaodong Liu, Cupertino, CA (US); Christopher A. Pohl, Union City, CA (US); Jinhua Chen, San Jose, CA (US); L. Andy Woodruff, San Jose, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 1236 days.

(21) Appl. No.: 12/118,447

(22) Filed: May 9, 2008

(65) Prior Publication Data

US 2009/0277838 A1    Nov. 12, 2009

(51) Int. Cl.
*B01D 15/36* (2006.01)
*B01D 15/32* (2006.01)
(Continued)

(52) U.S. Cl.
CPC ............ *B01D 15/362* (2013.01); *B01D 15/325* (2013.01); *B01D 15/363* (2013.01);
(Continued)

(58) Field of Classification Search
CPC ............ B01D 15/3847; B01D 15/361; B01D 15/362; B01D 15/363; B01J 20/28097; B01J 20/3221; B01J 20/3285; B01J 20/3295; B01J 39/26; B01J 41/20; B01J 43/00
USPC .............................. 210/502.1, 635, 656, 198.2
See application file for complete search history.

(56) References Cited

U.S. PATENT DOCUMENTS 3,926,559 A * 12/1975 Stevens ........................ 436/79
4,252,644 A *  2/1981 Small et al. .................. 210/656
(Continued)

FOREIGN PATENT DOCUMENTS

WO    WO 99 12624  A1    3/1999
WO    WO03022433  A2    3/2003
(Continued)

OTHER PUBLICATIONS

Mikes' Handbook of Chromatographic and Allied Methods, John Wiley&Sons, New York, 1979, pp. 157-159.*
(Continued)

*Primary Examiner* — Ernest G Therkorn
(74) *Attorney, Agent, or Firm* — David J. Brezner

(57) ABSTRACT

The current invention provides compositions, which are useful as stationary phases for a variety of chromatographic applications, such as high performance liquid chromatography (HPLC) and solid-phase extraction (SPE). The compositions include a porous solid support (e.g., silica gels, silica monoliths or synthetic organic resins) having an exterior surface and pore openings defined by "interior walls". To the solid support are covalently bound organic ion-exchange ligands (e.g., silyl ligands), which incorporate at least one ion-exchange group (e.g., ionic or ionizable group). The compositions further include micro-particles (e.g., latex particles) incorporating ion-exchange groups having a charge that is opposite to the charge found on the support. The micro-particles are bound to the exterior surface of the support (e.g., via electrostatic forces). The micro-particles have a size that is sufficient to minimize the number of particles that can enter the pores of the support thereby reducing or essentially preventing binding of the micro-particles to the interior walls of the pores. While the pores are essentially too small for the micro-particles, they can still be accessed by the analytes present in a chromatographic sample. The physical separation of ion-exchange groups located within the pores and the surface of the micro-particles, respectively, prevents reactions (e.g., formation of salt-bridges) between the oppositely charged groups and provides compositions with both anion-exchange and cation-exchange capabilities within the same stationary phase. The ligands bound to the solid support can optionally include additional (e.g., reverse-phase) functionalities creating multi-modal (e.g., trimodal) stationary phases.

18 Claims, 17 Drawing Sheets

(51) Int. Cl.
*B01J 20/28* (2006.01)
*B01J 20/32* (2006.01)
*B01J 39/26* (2006.01)
*B01J 43/00* (2006.01)
*B01D 15/38* (2006.01)

(52) U.S. Cl.
CPC ....... *B01D15/3847* (2013.01); *B01J 20/28097* (2013.01); *B01J 20/3221* (2013.01); *B01J 20/3285* (2013.01); *B01J 20/3295* (2013.01); *B01J 39/26* (2013.01); *B01J 43/00* (2013.01); *B01D 15/361* (2013.01)

(56) References Cited

U.S. PATENT DOCUMENTS

| | | | |
|---|---|---|---|
| 4,314,823 A * | 2/1982 | Rich et al. | 436/100 |
| 4,351,909 A * | 9/1982 | Stevens | 521/28 |
| 4,376,047 A | 3/1983 | Pohl et al. | |
| 4,382,124 A | 5/1983 | Meitzner et al. | |
| 4,383,047 A | 5/1983 | Stevens et al. | |
| 4,455,233 A * | 6/1984 | Pohl et al. | 210/635 |
| 4,519,905 A | 5/1985 | Stevens et al. | |
| 4,782,040 A * | 11/1988 | Revis et al. | 502/401 |
| 4,874,520 A * | 10/1989 | Lee | 210/635 |
| 4,927,539 A * | 5/1990 | Stevens et al. | 210/635 |
| 5,110,784 A * | 5/1992 | Williams et al. | 502/401 |
| 5,130,343 A | 7/1992 | Frechet et al. | |
| 5,147,536 A * | 9/1992 | Engstrom | 210/198.2 |
| 5,260,094 A | 11/1993 | Giannelis et al. | |
| 5,324,752 A | 6/1994 | Barretto et al. | |
| 5,328,603 A * | 7/1994 | Velander et al. | 210/198.2 |
| 5,334,310 A | 8/1994 | Frechet et al. | |
| 5,453,185 A | 9/1995 | Frechet et al. | |
| 5,532,279 A | 7/1996 | Barretto et al. | |
| 5,559,039 A * | 9/1996 | Williams | 436/161 |
| 5,728,457 A | 3/1998 | Frechet et al. | |
| 5,865,994 A | 2/1999 | Riviello et al. | |
| 5,925,253 A | 7/1999 | Pohl et al. | |
| 5,929,214 A | 7/1999 | Peters et al. | |
| 5,936,003 A | 8/1999 | Pohl et al. | |
| 5,968,363 A | 10/1999 | Riviello et al. | |
| 6,074,555 A * | 6/2000 | Boos et al. | 210/198.2 |
| 6,248,798 B1 | 6/2001 | Slingsby et al. | |
| 6,290,853 B1 * | 9/2001 | Allmer et al. | 210/635 |
| 6,528,167 B2 | 3/2003 | O'Gara | |
| 6,881,761 B2 * | 4/2005 | Kotsuka et al. | 521/32 |
| 6,887,384 B1 | 5/2005 | Frechet et al. | |
| 7,074,331 B2 | 7/2006 | Allington et al. | |
| 7,303,671 B2 | 12/2007 | Srinivasan et al. | |
| 7,402,243 B2 | 7/2008 | Liu et al. | |
| 2002/0134729 A1 * | 9/2002 | Muranaka et al. | 210/656 |
| 2005/0023203 A1 | 2/2005 | Orlovsky | |
| 2005/0242037 A1 * | 11/2005 | Berg et al. | 210/656 |
| 2006/0051583 A1 * | 3/2006 | Lau et al. | 428/407 |
| 2006/0070937 A1 | 4/2006 | Rustamov et al. | |
| 2008/0164211 A1 * | 7/2008 | Lindner et al. | 210/656 |

FOREIGN PATENT DOCUMENTS

| | | |
|---|---|---|
| WO | WO2005047886 A1 | 5/2005 |
| WO | WO2006088760 A1 | 8/2006 |

OTHER PUBLICATIONS

Berge, S.M. et al. Pharmaceutical salts. *Journal of Pharmaceutical Science,* 66(1):1-19 (1977).

Maehr, H. A proposed new convention for graphic presentation of molecular geometry and topography. *J. Chem. Ed.,* 62:114-120 (1985).

Ikada, Y. et al. Reaction of poly(vinyl alcohol) with potassium persulfate and graft copolymerization. *Journal of Polymer Science,* 12:1829-1839 (1974).

Minakuchi, H. et al. Octadecylsilylated porous silica rods as separation media for reversed-phase liquid chromatography. *Anal. Chem.* 68:3498-3501 (1996).

Minakuchi, H. et al. Effect of domain size on the performance of octadecylsilylated continuous porous silica columns in reversed-phase liquid chromatography. *J. Chromatogr A.* 797:121-131 (1998).

Majors, R.E. Developments in HPLC column packing design. *LCGC* 24(S4):8-15 (2006).

Majors, R.E. New chromatography columns and accessories at Pittcon 2008: Part I.. *LCGC* 26(3):238-253 (2008).

Majors, R.E. Developments in HPLC column technology (2006-2008). *LCGC* 26(S4):10-17 (2008).

Hutchinson, J.P. et al. Preparation and characterisation of anion-exchange latex-coated silica monoliths for capillary electrochromatography. *J. Chromatogr A.* 1109:10-18 (2006).

Glenn, K.M. et al. Ion chromatography on a latex-coated silica monolith column. *J. Chromatogr A.* 1155:8-14 (2007).

Motokawa, M. et al. Monolithic silica columns with various skeleton sizes and through-pore sizes for capillary liquid chromatography. *J. Chromatogr. A* 961:53-63 (2002).

Muenter, M.M., K.C. Stokes, R.T. Obie, J.R. Jezorek. Simultaneous separation of inorganic ions and neutral organics on ion-exchange stationary phases, *J. Chromatog. A.* 844:39-51 (1999).

Dionex datasheet, Acclaim Trinity P1 Column, 6 pages, 2010.

Dionex datasheet, Column, IonPac(R) AS7 Anion-Exchange Column, 4 pages, 2006.

* cited by examiner

FIG. 1A
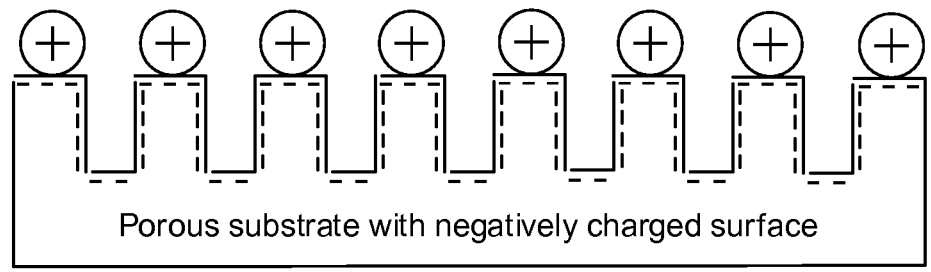
 Positively charged microparticles (e.g., polymer latex particles)

FIG. 1B
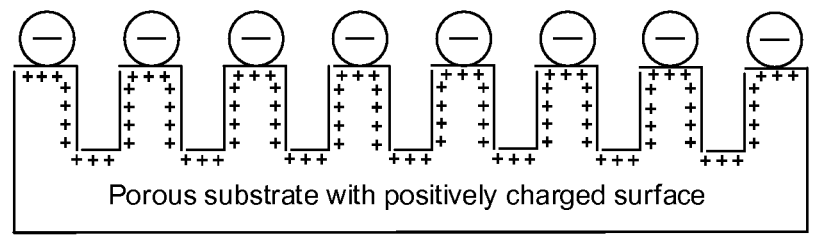
 Negatively charged microparticles (e.g., polymer latex particles)

FIG. 10 A

| Composition | Solid Support | Ion-Exchange Solid Support | Charged Micro-Particles |
|---|---|---|---|
| 37 | A | 19 | Sulfonated Latex |
| 37a | B | 19 | Sulfonated Latex |
| 37b | C | 19 | Sulfonated Latex |
| 37c | F | 19 | Sulfonated Latex |
| 37d | A | 19 | Carboxylated Latex |
| 37e | B | 19 | Carboxylated Latex |
| 37f | C | 19 | Carboxylated Latex |
| 37g | F | 19 | Carboxylated Latex |
| 38 | A | 20 | Sulfonated Latex |
| 38a | B | 20 | Sulfonated Latex |
| 38b | C | 20 | Sulfonated Latex |
| 38c | F | 20 | Sulfonated Latex |
| 38d | A | 20 | Carboxylated Latex |
| 38e | B | 20 | Carboxylated Latex |
| 38f | C | 20 | Carboxylated Latex |
| 38g | F | 20 | Carboxylated Latex |
| 39 | A | 21 | Sulfonated Latex |
| 39a | B | 21 | Sulfonated Latex |
| 39b | C | 21 | Sulfonated Latex |
| 39c | F | 21 | Sulfonated Latex |
| 39d | A | 21 | Carboxylated Latex |
| 39e | B | 21 | Carboxylated Latex |
| 39f | C | 21 | Carboxylated Latex |
| 39g | F | 21 | Carboxylated Latex |
| 40 | A | 22 | Sulfonated Latex |
| 40a | B | 22 | Sulfonated Latex |
| 40b | C | 22 | Sulfonated Latex |

FIG. 10 B

| Composition | Solid Support | Ion-Exchange Solid Support | Charged Micro-Particles |
|---|---|---|---|
| 40c | F | 22 | Sulfonated Latex |
| 40d | A | 22 | Carboxylated Latex |
| 40e | B | 22 | Carboxylated Latex |
| 40f | C | 22 | Carboxylated Latex |
| 40g | F | 22 | Carboxylated Latex |
| 41 | A | 23 | Sulfonated Latex |
| 41a | B | 23 | Sulfonated Latex |
| 41b | C | 23 | Sulfonated Latex |
| 41c | F | 23 | Sulfonated Latex |
| 41d | A | 23 | Carboxylated Latex |
| 41e | B | 23 | Carboxylated Latex |
| 41f | C | 23 | Carboxylated Latex |
| 41g | F | 23 | Carboxylated Latex |
| 42 | A | 24 | Sulfonated Latex |
| 42a | B | 24 | Sulfonated Latex |
| 42b | C | 24 | Sulfonated Latex |
| 42c | F | 24 | Sulfonated Latex |
| 42d | A | 24 | Carboxylated Latex |
| 42e | B | 24 | Carboxylated Latex |
| 42f | C | 24 | Carboxylated Latex |
| 42g | F | 24 | Carboxylated Latex |
| 43 | A | 25 | Sulfonated Latex |
| 43a | B | 25 | Sulfonated Latex |
| 43b | C | 25 | Sulfonated Latex |
| 43c | F | 25 | Sulfonated Latex |
| 43d | A | 25 | Carboxylated Latex |
| 43e | B | 25 | Carboxylated Latex |
| 43f | C | 25 | Carboxylated Latex |

FIG. 10 C

| Composition | Solid Support | Ion-Exchange Solid Support | Charged Micro-Particles |
|---|---|---|---|
| 43g | F | 25 | Carboxylated Latex |
| 44 | A | 26 | Sulfonated Latex |
| 44a | B | 26 | Sulfonated Latex |
| 44b | C | 26 | Sulfonated Latex |
| 44c | F | 26 | Sulfonated Latex |
| 44d | A | 26 | Carboxylated Latex |
| 44e | B | 26 | Carboxylated Latex |
| 44f | C | 26 | Carboxylated Latex |
| 44g | F | 26 | Carboxylated Latex |
| 45 | A | 27 | Sulfonated Latex |
| 46 | B | 27 | Sulfonated latex |
| 47 | C | 27 | Sulfonated latex |
| 45a | A | 27 | Carboxylated Latex |
| 46a | B | 27 | Carboxylated Latex |
| 47a | C | 27 | Carboxylated Latex |
| 47b | F | 27 | Carboxylated Latex |
| 48 | A | 28 | Sulfonated Latex |
| 48a | B | 28 | Sulfonated Latex |
| 48b | C | 28 | Sulfonated Latex |
| 48c | F | 28 | Sulfonated Latex |
| 48d | A | 28 | Carboxylated Latex |
| 48e | B | 28 | Carboxylated Latex |
| 48f | C | 28 | Carboxylated Latex |
| 48g | F | 28 | Carboxylated Latex |
| 49 | A | 29 | Sulfonated Latex |
| 49a | B | 29 | Sulfonated Latex |
| 49b | C | 29 | Sulfonated Latex |
| 49c | F | 29 | Sulfonated Latex |

FIG. 10 D

| Composition | Solid Support | Ion-Exchange Solid Support | Charged Micro-Particles |
|---|---|---|---|
| 49d | A | 29 | Carboxylated Latex |
| 49e | B | 29 | Carboxylated Latex |
| 49f | C | 29 | Carboxylated Latex |
| 49g | F | 29 | Carboxylated Latex |
| 50 | A | 30 | Sulfonated Latex |
| 50a | B | 30 | Sulfonated Latex |
| 50b | C | 30 | Sulfonated Latex |
| 50c | F | 30 | Sulfonated Latex |
| 50d | A | 30 | Carboxylated Latex |
| 50e | B | 30 | Carboxylated Latex |
| 50f | C | 30 | Carboxylated Latex |
| 50g | F | 30 | Carboxylated Latex |
| 51 | A | 31 | Aminated Latex |
| 51a | B | 31 | Aminated Latex |
| 51b | C | 31 | Aminated Latex |
| 51c | F | 31 | Aminated Latex |
| 52 | A | 32 | Aminated Latex |
| 52a | B | 32 | Aminated Latex |
| 52b | C | 32 | Aminated Latex |
| 53 | A | 33 | Aminated Latex |
| 53a | B | 33 | Aminated Latex |
| 53b | C | 33 | Aminated Latex |
| 53c | F | 33 | Aminated Latex |
| 54 | A | 34 | Aminated Latex |
| 54a | B | 34 | Aminated Latex |
| 54b | C | 34 | Aminated Latex |
| 54c | F | 34 | Aminated Latex |
| 55 | A | 35 | Aminated Latex |

FIG. 10 E

| Composition | Solid Support | Ion-Exchange Solid Support | Charged Micro-Particles |
|---|---|---|---|
| 55a | B | 35 | Aminated Latex |
| 55b | C | 35 | Aminated Latex |
| 55c | F | 35 | Aminated Latex |
| 56 | A | 36 | Aminated Latex |
| 56a | B | 36 | Aminated Latex |
| 56b | C | 36 | Aminated Latex |
| 56c | F | 36 | Aminated Latex |
| 57 | A | none | Aminated Latex |
| 58 | D | none | Sulfonated Latex |
| 59 | E | none | Aminated Latex |
| 61 | F | 60 | Sulfonated Latex |
| 63 | F | 62 | Aminated Latex |
| 65 | PS-DVB | 64 | Sulfonated Latex |
| 65a | PS-DVB | 64 | Carboxylated Latex |
| 67 | PS-DVB | 66 | Aminated Latex |

FUNCTIONALIZED SUBSTRATES WITH ION-EXCHANGE PROPERTIES

FIELD OF THE INVENTION

This invention relates to compositions useful as stationary phases for chromatographic applications and methods of making and using the compositions.

BACKGROUND OF THE INVENTION

Selectivity is an important factor for a successful chromatographic separation. Common stationary phases for liquid chromatography, such as reversed-phase (RP), ion-exchange (IEX) and normal phase (NP) chromatography are frequently characterized by limited selectivity necessitating multiple analyses for a single sample.

Ion-exchange liquid chromatography (IEX-LC) is used to separate ionic or ionizable compounds. Despite its important role in the separation of proteins, nucleic acids, and inorganic ions, ion-exchange chromatography is rarely used for the analysis of hydrophobic, e.g., small organic molecules, partially due to the lack of hydrophobic retention.

Ion-pairing liquid chromatography is a powerful tool for manipulating the selectivity of a separation. It involves the addition of an ion-pairing reagent to the mobile phase to promote the formation of charged analytes. These reagents are comprised of an alkyl chain with an ionizable terminus. The columns used in ion-pairing chromatography are typically reverse phase (RP) columns (e.g. $C_{18}$ or $C_8$). Analytes with an opposite charge to the ion pairing reagent are retained longer, and the retention of analytes with the same charge as the pairing reagent is reduced. However, the retention of neutral analytes is nearly unaffected by the use of an ion-pairing reagent. In addition, ion-pairing chromatography often requires a dedicated column and long equilibration times. Further, the mobile phase is typically incompatible with mass-spectroscopy.

Mixed-mode chromatography combines aspects of ion-exchange and reverse-phase chromatography. The columns for mixed-mode chromatography combine both hydrophobic and ion-exchange functionalities and facilitate adjustable selectivity for a variety of different molecules. Hydrophilic and ionizable compounds that are difficult to separate using reverse-phase columns can frequently be resolved using mixed-mode resins. Generally, mixed-mode stationary phases incorporate either reversed-phase and anion-exchange capabilities or reversed-phase and cation-exchange capabilities and typically do not provide sufficient selectivity to retain and separate cations, anions and neutral analytes within a single analysis.

Packing materials bearing amphoteric or zwitterionic functionalities are known. However these materials are used with either anion-exchange or cation-exchange conditions, but do not provide both of these capabilities simultaneously. In these stationary phases, positive and negative charges are not sufficiently separated and tend to neutralize one another. Hence, a need exists for stationary phases that provide both cation-exchange and anion-exchange capabilities on the same solid support. It is further desirable to provide trimodal stationary phases with anion-exchange, cation-exchange and reverse-phase functionalities in order to retain and separate cations, anions and uncharged molecules within a single analysis. The present invention addresses these and other needs.

SUMMARY OF THE INVENTION

The current invention provides compositions, which are useful as stationary phases for a variety of chromatographic applications, such as liquid chromatography (LC) (e.g., high performance liquid chromatography (HPLC)) and solid phase extraction (SPE).

The compositions of the invention include anion-exchange, cation-exchange and optionally reverse-phase capabilities within the same chromatographic material. When choosing appropriate mobile phases, the compositions provide anion-exchange and cation-exchange capabilities simultaneously. This is made possible because a substantial number of the anion-exchange groups (e.g., basic groups) and a substantial number of the cation-exchange groups (e.g., acidic groups) are physically separated from each other, thereby preventing reactions (e.g., the formation of salt-bridges, neutralization of charge) between them.

In one embodiment, the invention provides a composition comprising a solid support (e.g., inorganic solid support, such as silica gel or silica monolith; or an organic polymeric solid support, such as a polystyrene-divinylbenzene co-polymer) and micro-particles (e.g., latex particles) bound to the solid support. In various examples, the composition includes cation-exchange groups, anion-exchange groups and reverse-phase moieties, wherein a substantial proportion (e.g., the majority) of the cation-exchange and the anion-exchange groups are sufficiently spaced from each other to essentially avoid reaction between them. In one example, the reverse-phase moieties are provided by organic ligands covalently linked to the solid support.

The present invention further provides a composition including a porous solid support (e.g., inorganic solid support, such as silica gel or silica monolith; or an organic polymeric solid support, such as polystyrene-divinylbenzene co-polymer) having an exterior surface and interior pores defined by interior walls. The pores extend to openings in the exterior surface. The composition further includes organic ligands covalently bound to the solid support (e.g. via reactive functional groups on the surface of the solid support and/or the ligand). The ligands are bound to the interior walls of the pores and optionally both, to the interior pore walls and the exterior surface of the support. In various examples, the ligands include at least one ion-exchange group having a first charge (selected from positive and negative). The composition further includes micro-particles (e.g., latex particles) that include ion-exchange groups having a second charge (selected from positive and negative), wherein the second charge is preferably opposite to the first charge. The micro-particles are bound (e.g., irreversibly), either directly or indirectly (e.g., via another layer of micro-particles), to the exterior surface of the solid support, e.g., via electrostatic forces. In certain embodiments, the average diameter of the micro-particles is equal to or larger than the average diameter of the pores so that the majority of the micro-particles is bound to the exterior surface.

The current invention further provides a composition of the invention in a flow-through bed suitable for use as a chromatographic medium. In addition, the invention provides a chromatography column including a composition of the invention. The invention further provides a chromatography column packed with a separation medium including a composition of the invention.

The current invention further provides a method for making a composition of the invention, e.g., for the separation of analytes in a liquid sample. The method includes: (a) providing a porous solid support (e.g., inorganic solid support, such as silica gel or silica monolith; or an organic polymeric solid support, such as polystyrene-divinylbenzene co-polymer) having an exterior surface and interior walls defining interior pores extending to openings in the exterior surface; (b)

covalently bonding organic ligands to the interior walls (and optionally both to the interior walls and the exterior surface), for example, via reactive functional groups on the surface of the solid support and/or the ligand. The ligands include at least one ion exchange group having a first charge (selected from positive and negative). The method further includes (c) bonding micro-particles (e.g., latex particles), directly or indirectly (e.g., via another layer of micro-particles), to the exterior surface of the solid support (e.g., via electrostatic forces). The micro-particles include ion exchange groups having a second charge selected from positive and negative. The second charge is preferably opposite to the first charge. In certain embodiments, the average diameter of the micro-particles is equal to or larger than the average diameter of the pores. In invention further provides a composition made by the above method.

The current invention further provides a chromatographic method (e.g., for separating analytes in a liquid sample) that involves flowing a liquid through a bed (e.g., packed bed or monolith) of a separation medium that includes a composition of the invention. In one example, the liquid (i.e. mobile phase) is a primarily aqueous medium, optionally including an organic solvent.

BRIEF DESCRIPTION OF THE DRAWINGS

FIG. 1A is a schematic representation of a composition of the invention, in which the surface of a porous support is functionalized with ion-exchange ligands incorporating at least one negatively charged or negatively ionizable ion-exchange group, such as a carboxylic acid- or sulfonic acid group. The outer surface of the porous support is further modified with micro-particles incorporating positively charged or positively ionizable ion-exchange groups (e.g., amino groups). In one example, under certain conditions (e.g., at about neutral pH), both the support and the micro-particles are charged, as shown.

FIG. 1B is a schematic representation of a composition of the invention, in which the surface of a porous support is functionalized with ion-exchange ligands incorporating at least one positively charged or positively ionizable ion-exchange group, such as an amino group. The outer surface of the porous support is further modified with micro-particles carrying negatively charged or negatively ionizable ion-exchange groups (e.g., carboxylic acid- or sulfonic acid groups). In one example, under certain conditions (e.g., at about neutral pH), both the support and the micro-particles are charged, as shown.

FIG. 10 is a table summarizing exemplary mixed mode media of the invention. In FIG. 10, (A) represents porous spherical silica gel with nominal pore sizes between about 60 Å and about 140 Å (e.g., spherical silica gel with dp: 5 micron; pore size: 120 Å; surface area: 300 m²/g), (B) represents porous spherical silica gel with nominal pore sizes between about 140 Å and about 240 Å (e.g., dp: 5 micron; pore size: 200 Å; surface area: 200 m²/g), (C) represents porous spherical silica gel with nominal pore sizes between about 240 Å and about 330 Å (e.g., dp: 5 micron; pore size: 300 Å; surface area: 100 m²/g), (D) represents basic aluminum oxide powder, (E) represents acidic aluminum oxide powder and (F) represents silica monolith. In FIG. 10, "sulfonated latex" is sulfonated 4-methylstyrene/divinylstyrene copolymer (e.g., with 5% cross-linking, dp: 150 nm), "aminated latex" is aminated vinylbenzylglycidyl ether/divinylstyrene copolymer (e.g., with 6% cross-linking, dp: 70 nm), "carboxylated latex" is glycidyloxyethyl methacrylate (GLEMA) based (e.g., Example 3.3.), and "PS-DVB" is polystyrene-divinylbenzene copolymer.

DETAILED DESCRIPTION OF THE INVENTION

I. Definitions

Figure 2:
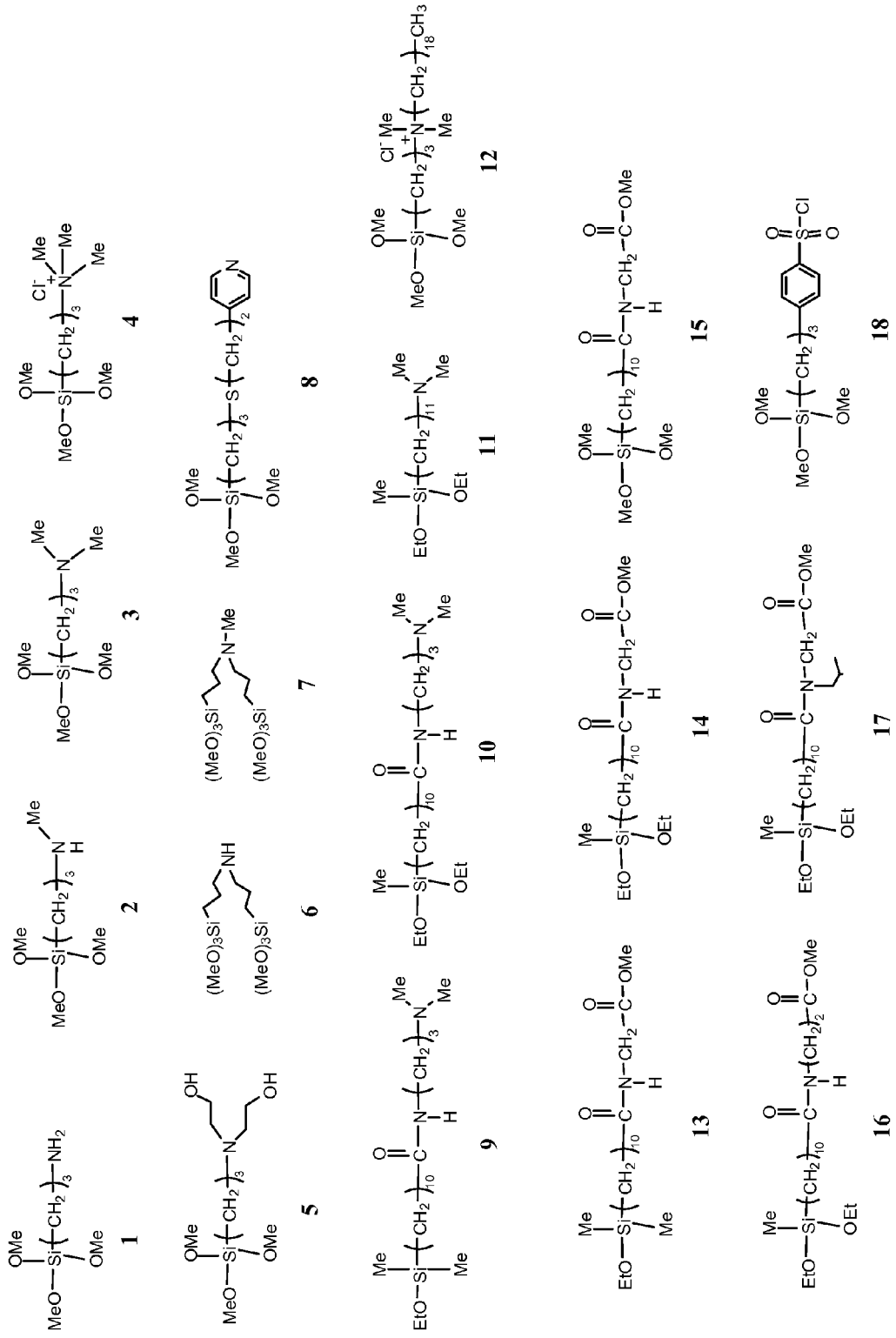
FIG. 2 illustrates exemplary reactive silyl ligands, which are useful for making the functionalized supports and micro-particles (e.g., those with ionic or ionizable/charged surfaces) according to the invention.

Where substituent groups are specified by their conventional chemical formulae, written from left to right, they equally encompass the chemically identical substituents, which would result from writing the structure from right to left, e.g., —$CH_2O$— is intended to also recite —$OCH_2$—.

The term "alkyl," by itself or as part of another substituent, means, unless otherwise stated, a straight or branched chain, or cyclic hydrocarbon radical, or combination thereof, which may be filly saturated, mono- or polyunsaturated and can include di- and multivalent radicals, having the number of carbon atoms designated (i.e. $C_1$-$C_{10}$ means one to ten carbons). Examples of saturated hydrocarbon radicals include, but are not limited to, groups such as methyl, ethyl, n-propyl (e.g., —$CH_2$—$CH_2$—$CH_3$, —$CH_2$—$CH_2$—$CH_2$—), isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. The term "alkyl," unless otherwise noted, is also meant to include those derivatives of alkyl defined in more detail below, such as "heteroalkyl." Alkyl groups that are limited to hydrocarbon groups are termed "homoalkyl". The term "alkyl" can also mean "alkylene" or "alkyldiyl" as well as alkylidene in those cases where the alkyl group is a divalent radical.

The term "alkylene" or "alkyldiyl" by itself or as part of another substituent means a divalent radical derived from an alkyl group, as exemplified, but not limited, by —$CH_2CH_2CH_2$— (propylene or propane-1,3-diyl), and further includes those groups described below as "heteroalkylene." Typically, an alkyl (or alkylene) group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl", "lower alkylene" or "lower alkyldiyl" is a shorter chain alkyl, alkylene or alkyldiyl group, generally having about 10 or fewer carbon atoms, about 8 or fewer carbon atoms, about 6 or fewer carbon atoms or about 4 or fewer carbon atoms.

The term "alkylidene" by itself or as part of another substituent means a divalent radical derived from an alkyl group, as exemplified, but not limited, by $CH_3CH_2CH_2$=(propylidene). Typically, an alkylidene group will have from 1 to about 30 carbon atoms, preferably from 1 to about 25 carbon atoms, more preferably from 1 to about 20 carbon atoms, even more preferably from 1 to about 15 carbon atoms and most preferably from 1 to about 10 carbon atoms. A "lower alkyl" or "lower alkylidene" is a shorter chain alkyl or alkylidene group, generally having about 10 or fewer carbon atoms, about 8 or fewer carbon atoms, about 6 or fewer carbon atoms or about 4 or fewer carbon atoms.

The terms "alkoxy," "alkylamino" and "alkylthio" (or thioalkoxy) are used in their conventional sense, and refer to those alkyl groups attached to the remainder of the molecule via an oxygen atom, an amino group, or a sulfur atom, respectively.

The term "heteroalkyl," by itself or in combination with another term, means, unless otherwise stated, a stable straight or branched chain, or cyclic hydrocarbon radical, or combinations thereof, consisting of the stated number of carbon atoms and at least one heteroatom selected from the group consisting of O, N, Si, S and B, and wherein the nitrogen and sulfur atoms may optionally be oxidized and the nitrogen heteroatom may optionally be quaternized. The heteroatom(s) O, N, B, S and Si may be placed at any interior position of the heteroalkyl group or at the position at which the alkyl group is attached to the remainder of the molecule. Examples include, but are not limited to, —$CH_2$—$CH_2$—O—$CH_3$, —$CH_2$—$CH_2$—NH—$CH_3$, —$CH_2$—$CH_2$—N($CH_3$)—$CH_3$, —$CH_2$—S—$CH_2$—$CH_3$, —$CH_2$—$CH_2$, —S(O)—$CH_3$, —$CH_2$—$CH_2$—S(O)$_2$—$CH_3$, —CH=CH—O—$CH_3$, —Si($CH_3$)$_3$, —$CH_2$—CH=N—$OCH_3$, and —CH=CH—N($CH_3$)—$CH_3$. Up to two heteroatoms may be consecutive, such as, for example, —$CH_2$—NH—$OCH_3$ and —$CH_2$—O—Si($CH_3$)$_3$. Similarly, the term "heteroalkylene" by itself or as part of another substituent means a divalent radical derived from heteroalkyl, as exemplified, but not limited by, —$CH_2$—$CH_2$—S—$CH_2$—$CH_2$— and —$CH_2$—S—$CH_2$—$CH_2$—NH—$CH_2$—. For heteroalkylene groups, heteroatoms can also occupy either or both of the chain termini (e.g., alkyleneoxy, alkylenedioxy, alkyleneamino, alkylenediamino, and the like). Still further, for alkylene and heteroalkylene linking groups, no orientation of the linking group is implied by the direction in which the formula of the linking group is written. For example, the formula —$CO_2R'$— represents both —C(O)OR' and —OC(O)R'.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like.

The terms "halo" or "halogen," by themselves or as part of another substituent, mean, unless otherwise stated, a fluorine, chlorine, bromine, or iodine atom. Additionally, terms such as "haloalkyl," are meant to include monohaloalkyl and polyhaloalkyl. For example, the term "halo($C_1$-$C_4$)alkyl" is mean to include, but not be limited to, trifluoromethyl, 2,2,2-trifluoroethyl, 4-chlorobutyl, 3-bromopropyl, and the like.

The term "aryl" means, unless otherwise stated, a polyunsaturated, aromatic, substituent that can be a single ring or multiple rings (preferably from 1 to 3 rings), which are fused together or linked covalently. The term "heteroaryl" refers to aryl groups (or rings) that contain from one to four heteroatoms selected from N, O, S, Si and B, wherein the nitrogen and sulfur atoms are optionally oxidized, and the nitrogen atom(s) are optionally quaternized. A heteroaryl group can be attached to the remainder of the molecule through a heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of the above noted aryl and heteroaryl ring systems are selected from the group of acceptable substituents described below.

For brevity, the term "aryl" when used in combination with other terms (e.g., aryloxy, arylthioxy, arylalkyl) includes both aryl and heteroaryl rings as defined above. Thus, the term "arylalkyl" is meant to include those radicals in which an aryl group is attached to an alkyl group (e.g., benzyl, phenethyl, pyridylmethyl and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like).

Each of the above terms (e.g., "alkyl," "heteroalkyl," "aryl" and "heteroaryl") are meant to include both substituted and unsubstituted forms of the indicated radical. Preferred substituents for each type of radical are provided below.

Substituents for the alkyl and heteroalkyl radicals (including those groups often referred to as alkylene, alkenyl, heteroalkylene, heteroalkenyl, alkynyl, cycloalkyl, heterocycloalkyl, cycloalkenyl, and heterocycloalkenyl) are generically referred to as "alkyl group substituents," and they can be one or more of a variety of groups selected from, but not limited to: substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R''', —OC(O)R', —C(O)R', —CO$_2$R', —CONR'R", —OC(O)NR'R", —NR"C(O)R', —NR'—C(O)NR"R''', —NR"C(O)$_2$R', —NR—C(NR'R"R''')=NR"", —NR—C(NR'R")=NR''', —S(O)R', —S(O)$_2$R', —OS(O)$_2$R', —S(O)$_2$NR'R", —NRSO$_2$R', —CN and —NO$_2$ in a number ranging from zero to (2 m'+1), where m' is the total number of carbon atoms in such radical. R', R", R''' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R''' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for the alkyl radical, substituents for the aryl and heteroaryl groups are generically referred to as "aryl group substituents." The substituents are selected from, for example: substituted or unsubstituted alkyl, substituted or unsubstituted aryl, substituted or unsubstituted heteroaryl, substituted or unsubstituted heterocycloalkyl, —OR', =O, =NR', =N—OR', —NR'R", —SR', -halogen, —SiR'R"R''', —OC(O)R', —C(O)R', —CO$_2$R', —CONR'R", —OC(O)NR'R", —NR"C(O)R', —NR'—C(O)NR"R''', —NR"C(O)$_2$R', —NR—C(NR'R"R''')=NR"", —NR—C(NR'R")=NR''', —S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxy, and fluoro(C$_1$-C$_4$)alkyl, in a number ranging from zero to the total number of open valences on the aromatic ring system; and where R', R", R''' and R"" are preferably independently selected from hydrogen, substituted or unsubstituted alkyl, substituted or unsubstituted heteroalkyl, substituted or unsubstituted aryl and substituted or unsubstituted heteroaryl. When a compound of the invention includes more than one R group, for example, each of the R groups is independently selected as are each R', R", R''' and R"" groups when more than one of these groups is present.

Two of the substituents on adjacent atoms of the aryl or heteroaryl ring may optionally be replaced with a substituent of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of the aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4. One of the single bonds of the new ring so formed may optionally be replaced with a double bond. Alternatively, two of the substituents on adjacent atoms of the aryl or heteroaryl ring may optionally be replaced with a substituent of the formula —(CRR')$_s$—X—(CR"R''')$_d$—, where s and d are independently integers of from 0 to 3, and X is —O—, —NR'—, —S—, —S(O)—, —S(O)$_2$—, or —S(O)$_2$NR'—. The substituents R, R', R" and R''' are preferably independently selected from hydrogen or substituted or unsubstituted (C$_1$-C$_6$)alkyl.

As used herein, the term "silyl group substituent" can be one or more of a variety of groups selected from, but not limited to: substituted or unsubstituted alkyl, substituted or unsubstituted heteroalkyl, substituted or unsubstituted aryl, substituted or unsubstituted heteroaryl, substituted or unsubstituted heterocycloalkyl, acyl, —OR', —NR'R", —SR', -halogen, —SiR'R"R''', —OC(O)R', —C(O)R', —CO$_2$R', —CONR'R", —OC(O)NR'R", —NR"C(O)R', —NR'—C(O)NR"R''', —NR"C(O)$_2$R', —NR—C(NR'R"R''')=NR"", —NR—C(NR'R")=NR''', —S(O)R', —S(O)$_2$R', —OS(O)$_2$R', —S(O)$_2$NR'R", —NRSO$_2$R', —CN and —NO$_2$. R', R", R''' and R"" each preferably independently refer to hydrogen, substituted or unsubstituted heteroalkyl, substituted or unsubstituted aryl, e.g., aryl substituted with 1-3 halogens, substituted or unsubstituted alkyl, alkoxy or thioalkoxy groups, or arylalkyl groups. When a compound of the invention includes more than one R group, for example, each of the R groups is independently selected as are each R', R", R''' and R"" groups when more than one of these groups is present. When R' and R" are attached to the same nitrogen atom, they can be combined with the nitrogen atom to form a 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF₃ and —CH₂CF₃) and acyl (e.g., —C(O)CH₃, —C(O)CF₃, —C(O)CH₂OCH₃, and the like).

As used herein, the term "non-reactive silyl group substituent" means a "silyl group substituent" that does not react with a substrate of the invention to form a covalent bond between the silyl group substituent and the substrate. Exemplary "non-reactive silyl group substituents" include alkyl (e.g., methyl, ethyl, propyl, butyl and other lower alkyl groups) or aryl groups (e.g., phenyl).

As used herein, the term "reactive silyl group substituent" means a "silyl group substituent" that is capable of reacting with a substrate of the invention to form a covalent bond between the silyl group substituent and the substrate. Exemplary "reactive silyl group substituents" include those groups that are conventionally defined as leaving groups, such as halogens (e.g., Cl and Br). Other exemplary "reactive silyl group substituents" include alkoxy groups (e.g., methoxy or ethoxy) and primary and secondary amino groups.

As used herein, the term "acyl" describes a substituent containing a carbonyl residue, C(O)R. Exemplary species for R include H, halogen, substituted or unsubstituted alkyl, substituted or unsubstituted hetroalkyl, substituted or unsubstituted aryl, substituted or unsubstituted heteroaryl, and substituted or unsubstituted heterocycloalkyl.

As used herein, the term "fused ring system" means at least two rings, wherein each ring has at least 2 atoms in common with another ring. "Fused ring systems may include aromatic as well as non aromatic rings. Examples of "fused ring systems" are naphthalenes, indoles, quinolines, chromenes and the like.

As used herein, the term "heteroatom" includes oxygen (O), nitrogen (N), sulfur (S), silicon (Si) and boron (B).

The symbol "R" is a general abbreviation that represents a substituent group that is selected from substituted or unsubstituted alkyl, substituted or unsubstituted heteroalkyl, substituted or unsubstituted aryl, substituted or unsubstituted heteroaryl, and substituted or unsubstituted heterocycloalkyl groups.

As used herein, the term "hydrophobic moiety" describes a moiety that does preferably not include internal ionic, ionizable or polar groups and/or does preferably not include ionic, ionizable or polar substituents and is therefore hydrophobic in nature. Exemplary ionic and ionizable groups are described herein. Polar groups that are preferably not included in a hydrophobic moiety include ether groups, amide groups, sulfonamide groups, urea groups, carbamate groups, carbonate groups and the like. Exemplary polar substituents that are preferably not included in the hydrophobic moiety include hydroxyl groups, alkoxy groups, ester groups and the like. A typical hydrophobic moiety includes a carbon chain having a number of carbon atoms in sequence, wherein this number is defined by a lower and/or an upper limit. With respect to the lower limit the hydrophobic moiety has at least 3, at least 4, at least 5, at least 6, at least 7, at least 8, at least 9, at least 10, at least 11, at least 12, at least 13, at least 14, at least 15, at least 16, at least 17, at least 18, at least 19, or at least 20 carbon atoms in sequence. With respect to the higher limit, the hydrophobic moiety includes preferably not more than about 50 carbon atoms in sequence, not more than about 30 carbon atoms, not more than about 25 carbon atoms, not more than about 20 carbon atoms, not more than about 15 carbon atoms, not more than about 14, not more than about 13, not more than about 12, not more than about 11, not more than about 10, not more than about 9 or not more than about 8 carbon atoms in sequence. Exemplary ranges for the number of carbon atoms in sequence may be formed between any of the above described higher and lower limits. In a particular embodiment, a hydrophobic moiety has at least 8 carbon atoms in sequence. In another embodiment, the hydrophobic moiety has at least 8 carbon atoms, but not more than 20 carbon atoms in sequence. Within the "hydrophobic moiety", at least two of the carbon atoms in sequence are optionally part of a ring (e.g., a 5- or 6-membered ring), wherein the ring is a member selected from aryl, heteroaryl, cycloalkyl and a fused ring system that can include aryl, heteroaryl and cycloalkyl rings. The ring is optionally substituted with a non-polar (hydrophobic) substituent, such as an unsubstituted alkyl group (e.g., methyl, ethyl or propyl group). In one example, the hydrophobic moiety is part of a ligand or a functionalized substrate of the invention and is sufficiently hydrophobic for the ligand or functionalized substrate to exhibit reversed phase characteristics (e.g., at least $C_8$ alkyl).

As used herein, the term "ion-exchange group" refers to an ionic group or an ionizable group. Ionic groups are charged (e.g., positively charged quaternary amine), while ionizable groups can be charged or non-charged depending on the conditions to which the ionizable group is exposed (i.e., basic or acidic groups). For example, a tertiary amino group can be charged by accepting a proton (basic group) while a carboxylic acid group can be charged by donating a proton (acidic group). Ion-exchange groups include anion-exchange groups, cation-exchange groups, amphoteric and zwitterionic groups. Anion-exchange groups include primary, secondary, tertiary and quaternary amines, as well as any other basic (proton-accepting) functionalities. Cation-exchange groups include sulfonates, sulfates, carboxylates, phosphonates, phosphates, silanols, phenolic hydroxyl groups and any other acidic (proton-donating) functionalities. Amphoteric and zwitterionic ligands include at least one anion-exchange and at least one cation-exchange group, each of which can be selected from the above described ion-exchange groups.

As used herein, the terms "having a charge", "charged", "positively charged", "negatively charged" and any grammatical variation thereof, in connection with the substrates and micro-particles of the invention, indicate that the material includes ion-exchange groups. As described above, ion-exchange groups can be either ionic or ionizable in nature. Hence, the term "charged" or "having a charge" can mean incorporating "ionic" or "ionizable" groups.

The terms "substrate" and "support" or "solid support" are used interchangeably.

The term "essentially retained" refers to an analyte (e.g., an ion, an ionizable compound, an uncharged molecule and the like) and means that the analyte elutes from the separation medium after the void volume, e.g., giving rise to a peak with baseline separation from the solvent peak.

When compounds of the present invention contain relatively basic or acidic functionalities, salts of such compounds are included in the scope of the invention. Salts can be obtained by contacting the neutral form of such compounds with a sufficient amount of the desired acid or base, either neat or in a suitable inert solvent. Examples of salts for relative acidic compounds of the invention include sodium, potassium, calcium, ammonium, organic amino, or magnesium salts, or a similar salts. When compounds of the present invention contain relatively basic functionalities, acid addition salts can be obtained by contacting the neutral form of such compounds with a sufficient amount of the desired acid, either neat or in a suitable inert solvent. Examples of acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from organic acids like acetic, propionic, isobutyric, maleic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like (see, for example, Berge et al., *Journal of Pharmaceutical Science* 1977, 66: 1-19). Certain specific compounds of the present invention contain both basic and acidic functionalities that allow the compounds to be converted into either base or acid addition salts.

The neutral forms of the compounds are preferably regenerated by contacting the salt with a base or acid and isolating the parent compound in the conventional manner. The parent form of the compound differs from the various salt forms in certain physical properties, such as solubility in polar solvents, but otherwise the salts are equivalent to the parent form of the compound for the purposes of the present invention.

Representations of acidic and basic groups optionally include charged versions and salt versions thereof. For example, a substituent having the formula "—C(O)OH" or "—COOH" is meant to optionally include —C(O)O$^-$ and —C(O)O$^-$X$^+$, wherein X$^+$ is a cationic counter-ion. Likewise, a substituent having the formula —N(R)(R) is meant to optionally include —N$^+$H(R)(R) and —N$^+$H(R)(R)Y$^-$, wherein Y$^-$ represents an anionic counter-ion.

The terms "average diameter of the pore", "average diameter of the pore opening" or any grammatical variation thereof, refer to the pore size specification of a substrate. Pore sizes are typically provided by the manufacturer of a chromatographic material (e.g. silica gels). Pore sizes can, for example, be determined using microscopy or porosimetry.

The terms "average diameter of the particle", "particle size", "average particle size", "median particle size", or any grammatical variation thereof refers to the particle size specification for a substrate (solid-support) of the invention. Particle-sizes are typically provided by the manufacturer. Particle sizes can refer to any type of particle including spherical and irregular-shaped particles.

Certain compounds of the present invention can exist in unsolvated forms as well as solvated forms, including hydrated forms. In general, the solvated forms are equivalent to unsolvated forms and are encompassed within the scope of the present invention. Certain compounds of the present invention may exist in multiple crystalline or amorphous forms. In general, all physical forms are equivalent for the uses contemplated by the present invention and are intended to be within the scope of the present invention. "Compound or a pharmaceutically acceptable salt or solvate of a compound" intends the inclusive meaning of "or", in that a material that is both a salt and a solvate is encompassed.

Certain compounds of the present invention possess asymmetric carbon atoms (optical centers) or double bonds; the racemates, diastereomers, geometric isomers and individual isomers are encompassed within the scope of the present invention. Optically active (R)- and (S)-isomers may be prepared using chiral synthons or chiral reagents, or resolved using conventional techniques. When the compounds described herein contain olefinic double bonds or other centers of geometric asymmetry, and unless specified Likewise, all tautomeric forms are also intended to be included.

The graphic representations of racemic, ambiscalemic and scalemic or enantiomerically pure compounds used herein are taken from Maehr, *J. Chem. Ed.*, 62: 114-120 (1985): solid and broken wedges are used to denote the absolute configuration of a chiral element; wavy lines indicate disavowal of any stereochemical implication which the bond it represents could generate; solid and broken bold lines are geometric descriptors indicating the relative configuration shown but not implying any absolute stereochemistry; and wedge outlines and dotted or broken lines denote enantiomerically pure compounds of indeterminate absolute configuration.

The terms "enantiomeric excess" and diastereomeric excess" are used interchangeably herein. Compounds with a single stereocenter are referred to as being present in "enantiomeric excess," those with at least two stereocenters are referred to as being present in "diastereomeric excess."

The compounds of the present invention may also contain unnatural proportions of atomic isotopes at one or more of the atoms that constitute such compounds. For example, the compounds may be radiolabeled with radioactive isotopes, such as, for example, deuterium, tritium ($^3$H), iodine-125 ($^{125}$I) and carbon-14 ($^{14}$C). All isotopic variations of the compounds of the present invention, whether radioactive or not, are intended to be encompassed within the scope of the present invention.

II. Introduction

The current invention provides compositions with unique chromatographic properties, which are useful as stationary phases for a variety of chromatographic applications, such as high performance liquid chromatography (HPLC) and solid-phase extraction (SPE). In certain embodiments, the compositions of the invention include both anion-exchange and cation-exchange capabilities within the same chromatographic material. In other embodiments, the compositions include anion-exchange, cation-exchange and reverse-phase capabilities within the same chromatographic material. In these compositions, the anion-exchange groups (e.g., basic groups) and cation-exchange groups (e.g., acidic groups) are physically removed (i.e., spacially separated) from each other in order to minimize or prevent reactions (e.g., formation of salt-bridges, electrostatic interaction, charge-neutralization) between them. In one example, the spacial separation of anion-exchange and cation-exchange groups is accomplished by providing one type of ion-exchange groups within pores of a porous support, while the other type of ion-exchange group is provided on micro-particles (e.g., latex particles), which are bound (e.g., irreversibly) to the outer surface of the solid support.

In one embodiment, the compositions according to the invention include a porous solid support (e.g., silica gels, silica monoliths or synthetic organic resins) having an exterior surface and pore openings defined by "interior walls" with an interior diameter defining the pore size. The pores open to the exterior surface of the substrate. The solid support includes ion exchange groups, which can be positively or negatively charged groups. In one example, the ion-exchange groups are provided by the support itself, e.g., by incorporation of charged monomers into a synthetic resin polymer or by ionizable silanol groups on the surface of a silica substrate. In another example, the solid support (e.g., silica gel, silica monoliths) is covalently modified (e.g., alongside the interior pore walls and optionally the exterior surface) with organic ion-exchange ligands (e.g., silyl ligands). The ligands incorporate at least one ion-exchange group (e.g., ionic or ionizable group). The ionic nature of the ligand can be positive or negative.

Exemplary ligands include basic and/or acidic ion-exchange groups. Exemplary ion-exchange groups include anion-exchange groups, such as amino groups (e.g., secondary, tertiary or quaternary amines) or cation-exchange groups, such as carboxylic acid or sulfonic acid groups. In one example, the ligand includes both anion-exchange and cation-exchange groups (i.e., zwitterionic or amphoteric ligands). The ligands can optionally include additional polar groups (e.g., ether, amide, sulfonamide, urea or carbonate groups). The ligands can also include hydrophobic moieties (e.g., alkyl or aromatic moieties). In one example, such hydrophobic moieties provide sufficient hydrophobicity to impart reverse-phase characteristics to the stationary phase in addition to the ion-exchange characteristics.

The compositions further include micro-particles, such as latex-based micro-particles, which are bound to the exterior surface of the above described ion-exchange substrate. For example, the micro-particles can be attached to the surface of the substrate via electrostatic forces (e.g., between a positively charged support and a negatively charged micro-particle). The micro-particles incorporate ion-exchange groups having a charge that is opposite to the charge found on the support. Exemplary micro-particles are functionalized with amino groups or sulfonic acid groups. In another example, the net-surface charge of the substrate is opposite to the net-surface charge of the micro-particles thereby providing a chromatographic material including both anion-exchange and cation-exchange sites, wherein the anion-exchange and cation-exchange sites are physically/spacially separated from each other.

In one example, the micro-particles have a size that is sufficient to minimize the number of particles that can enter the pores of the support thereby reducing or essentially preventing binding of the micro-particles to the interior walls of the pores. The micro-particles are ideally bound to the outer surface of the substrate (externally bound) as illustrated in FIG. 1A and FIG. 1B. Hence, in a preferred embodiment, the micro-particles have an average diameter equal to or larger than the average diameter of the pore openings. For example, while the pores have an average diameter of less than about 30 nm, the average diameter of the micro-particles is greater than about 50 nm. Hence, the interior walls of the pores remain intact upon binding of the micro-particles and retain their original functionalities and properties. By physically separating the ion-exchange groups located within the pores and the ion-exchange groups located at the surface of the micro-particles, the current compositions can provide both anion-exchange and cation-exchange capabilities simultaneously within the same stationary phase. The spacial separation of different ion-exchange groups in this manner prevents reactions (e.g., formation of salt-bridges) between the oppositely charged groups.

For example, the surface of the substrate (exterior surface and interior walls of pores) is derivatized with an organic ligand having anion-exchange (positively charged) sites. To the exterior surface are bound micro-particles that provide cation-exchange (negatively charged) sites. The micro-particles "block" the positively charged sites on the exterior surface of the substrate "replacing" them with the negatively charged sites on the surface of the micro-particles. However, because the micro-particles are too big to enter the pores, the interior walls of the pores continue to provide positively charged sites. The resulting composition provides anion-exchange sites in the interior of the pores and cation-exchange sites on the surface of the micro-particles, both separated from each other. A person of skill in the art will appreciate that the above strategy can be used to create a composition with cation-exchange sites within the pores and anion-exchange sites on the surface of the micro-particles.

While the pores are essentially too small for the micro-particles to penetrate, the pores can still be accessed by the analytes, which are present in a chromatographic sample. A liquid sample, containing one or more analytes can enter the pores and inside the pores, the analytes can interact with the ion-exchange ligands bound to the solid support. Thus, analytes within a liquid sample can interact with both the ion-exchange sites provided by the ligands within the pores and the ion-exchange sites provided by the micro-particles.

By physically separating the ion-exchange groups located within the pores and the ion-exchange groups located at the surface of the micro-particles, the current compositions can provide both anion-exchange and cation-exchange capabilities simultaneously within the same stationary phase. For example, the pH and composition of the mobile phase, which is used for a chromatographic separation, are selected so that both the anion-exchange groups and the cation-exchange groups are charged (e.g., at approximately neutral pH) and are thus both available for ionic interaction with an analyte. Alternatively, the mobile phase can be selected so that either the anion-exchange or the cation-exchange capability is dominating (i.e., the net-charge of the resin is positive or negative). Typically, such conditions will involve below or above neutral pH of the mobile phase, respectively.

The simultaneous presence of anion-exchange and cation-exchange groups that can be selectively utilized (e.g., "switched" on or off; "dialed" in or out) by choosing appropriate mobile phases, provides chromatographic stationary phases with unique properties. For example, the novel stationary phases can be used to simultaneously analyze anions and cations, each of which can be inorganic or organic. Because the novel stationary phases can be used as anion-exchange resins, cation-exchange resins or hybrids thereof, they provide exceptional chromatographic versatility.

In addition, when the porous solid support is modified with ligands incorporating hydrophobic moieties (e.g., providing reversed-phase characteristics), the resulting composition can combine anion-exchange, cation-exchange and reverse-phase functionalities (i.e., trimodal phases). Such compositions can be useful to analyze anions, cations and hydrophobic molecules simultaneously. In one example, a ligand with reverse-phase functionality incorporates a hydrophobic moiety (e.g., carbon chain with at least 8 carbon atoms in sequence).

In one example, additional layers of micro-particles can be attached to the above first layer of micro-particles (e.g., via electro-static attachment). Hence, the outer layer of micro-particles providing the desired ion-exchange characteristics may be attached to the solid support indirectly via one or more additional layers of micro-particles. In one example, a first layer of positively charged latex-particles is attached to the outer surface of the substrate. Onto the first layer of latex-particles is then added a second layer of micro-particles that are negatively charged. In another example, a first layer of negatively charged latex-particles is attached to the outer surface of the substrate. Onto the first layer is then added a second layer of micro-particles that are positively charged. Third layers (and subsequent layers) of micro-particles can be added accordingly (e.g., each with an opposite charge to the previous layer).

The benefits of the stationary phases provided by this invention include:
1. The compositions provide unique selectivity. For example, the compositions can be used to retain and separate cationic, anionic and neutral molecules within a single analysis (see Example 5 and FIG. 4-9).
2. The compositions can be used to chromatograph (e.g., retain) ionic or ionizable compounds without the use of ion-pairing reagents.

3. The selectivity of the current compositions can be adjusted by changing the chemical composition of the mobile phase. Properties of the mobile phase which can be used to modify the selectivities of the stationary phase include ionic strength, pH and additives, such as organic solvents.
4. The compositions are compatible with highly aqueous conditions (e.g., resistant to de-wetting in 100% aqueous conditions).
5. The compositions are characterized by a multi-mode retention mechanism, which may include anion-exchange, cation-exchange, reversed-phase, ion-exclusion, and HILIC.
6. The compositions are useful not only for making analytical separation columns, but also for developing new solid phases extraction (SPE) applications.
7. The compositions can be blended with other chromatographic packing materials to produce a variety of novel packing materials for both separation and SPE columns.
8. The compositions can be prepared in a versatile, facile and economic manner. The ratio of cation-exchange, anion-exchange and hydrophobic interaction can be synthetically adjusted by using base solid supports with different surface area and particle size, different latex chemistry and particle sizes, and/or different surface chemistry that forms the charged layer on the solid support.

III. Compositions

The present invention provides a composition including: (a) a porous solid support. The porous solid support has an exterior surface and interior pores defined by interior walls. The pores extend to openings in the exterior surface. The composition further includes (b) organic ion-exchange ligands covalently bound to the solid support including the interior walls of the pores. In various examples, the ligands include ion-exchange groups optionally having a first charge (selected from positive and negative). The composition further includes (c) micro-particles (e.g., latex particles) including ion-exchange groups optionally having a second charge (selected from positive or negative), wherein the second charge is opposite to the first charge. The micro-particles are bound (e.g., via electrostatic attraction), either directly (see e.g., U.S. Pat. No. 4,927,539 to Stevens et al., U.S. Pat. No. 4,351,909 to Stevens et al., U.S. Pat. No. 4,519,905 to Stevens et al., U.S. Pat. No. 4,383,047 and U.S. Pat. No. 5,532,279 to Barretto et al., each incorporated herein by reference) or indirectly (e.g., via additional layers of micro-particles, or a dispersant, see e.g., U.S. Pat. No. 5,532,279 to Baretto et al., incorporated herein by reference), to the exterior surface of the solid support.

In one example, the micro-particles are bound to the exterior surface in a manner allowing liquid flow into the interior pores of the solid support. In various embodiments, the average diameter of the micro-particles is equal to or larger than the average diameter of the pore openings. Because the pore openings are generally smaller than the micro-particles, only areas outside of the pores are typically coated with the micro-particles (e.g., latex-particles). A person of skill in the art will appreciate that pore sizes can vary significantly below and above an average pore size and will therefore understand that the material can contain a number of pores with micro-particles bound to the interior walls. However, by choosing a suitable ratio between pore size and micro-particle size, the number of pores containing micro-particles can be adjusted to create a composition with optimized functionalities. A small percentage of pores with interior micro-particles may even be desirable. Hence, the current invention encompasses compositions, in which a small number of micro-particles have penetrated the pore openings, as long as the majority (e.g., at least about 60%, at least about 70%, at least about 80%, at least about 90%, at least about 95%, at least about 98% or at least about 99%) of the micro-particles are bound to the exterior surface of the solid support.

Exemplary solid supports, organic ligands and micro-particles that are useful in the compositions and methods of the invention are described herein below.

Solid Support

The solid support (substrate) of the current invention can be any solid material that is characterized by pores (e.g., those useful as a stationary phase/packing material for chromatography). In one example, the solid support includes inorganic (e.g., silica) material. In another example, the solid support includes organic (e.g., polymeric) material (e.g., synthetic resins). In yet another example, the solid support includes a hybrid inorganic-organic material. The substrate is preferably insoluble in the solvent system used for the respective separation.

In one embodiment, the solid support includes metal oxides or metalloid oxides. Exemplary substrates include silica-based (e.g., silicon oxide, $SiO_2$), titania-based (e.g., titanium oxide, $TiO_2$), germanium-based (e.g., germanium oxide), zirconia-based (e.g., zirconium oxide, $ZrO_2$), alumina-based (e.g., aluminum oxide, $Al_2O_3$) materials or mixtures thereof. Other substrates include cross-linked and non-crosslinked polymers, carbonized materials and metals. Substrates can also incorporate polymeric networks, sol-gel networks or hybrid forms thereof. In one embodiment, the substrate is a silica-based substrate. Exemplary silica-based substrates include silica gel, glass, sol-gels, polymer/sol-gel hybrids and silica monolithic materials.

Exemplary synthetic resins useful as the organic substrate in the current invention are described in U.S. Pat. No. 4,927,539 to Stevens et al., U.S. Pat. No. 4,351,909 to Stevens et al., U.S. Pat. No. 4,519,905 to Stevens et al., U.S. Pat. Nos. 4,383,047 and 5,532,279 to Barretto et al., the disclosures of which are each incorporated herein by reference for all purposes.

The solid support may be formed from any synthetic resin material. Exemplary synthetic polymer ion-exchange resins include poly(phenol-formaldehyde), poly(acrylic acid), poly (methacrylic acid), polynitriles, amine-epichlorohydrin copolymers, graft polymers of styrene on polyethylene or polypropylene, poly (2-chloromethyl-1,3-butadiene), poly (vinylaromatic) resins such as those derived from styrene, alpha-methylstyrene, chlorostyrene, chloromethylstyrene, vinyltoluene, vinylnaphthalene or vinylpyridine, corresponding esters of acrylic acid and methacrylic acid, and similar unsaturated monomers, mono-vinylidene monomers including the monovinylidine ring-containing nitrogen heterocyclic compounds, and any copolymers of the above resins. Additional examples include glycidyl acrylate-based and glycidyl methacrylate-based materials (e.g., 2-glycidyloxyethyl methacrylate, vinylbenzyl glycidyl ether, 2-(4-vinylbenzyloxy) ethyl glycidyl ether) as well as those derived from vinylbenzyl chlorides, vinylbenzyl alcohols, 2-(4-vinylbenzyloxy) ethanol, polyacrylamides, polyvinylalcohols, polyvinylformamides.

Any of the above materials can optionally be co-polymerized with monomers incorporating ionic or ionizable (and optionally reverse-phase) functionalities. Any of the above materials can optionally be functionalized with a suitable ligand incorporating ionic or ionizable and optionally reverse-phase functionalities.

In one embodiment, the support comprises cross-linked polymers or copolymers. An exemplary copolymer is styrene-divinylbenzene copolymer (e.g., PS-DVB). In one example, the styrene-divinylbenzene copolymer contains between about 0% to about 100% divinylbenzene monomer by weight. In another example, the styrene-divinylbenzene copolymer contains between about 25% to about 80% divinylbenzene monomer by weight. The copolymer can be prepared, for example, according to the method of Ikada et al., *Journal of Polymer Science*, Vol. 12, 1829-1839 (1974) or as described in U.S. Pat. No. 4,382,124 to Meitzner, et al.

In one example, the solid support includes a silica-, alumina-, zirconia- or titania-polymeric resin hybrid material. Exemplary silica-organic hybrids are described in U.S. Pat. No. 6,528,167 and U.S. Patent Application Publication 2006/0070937 (application Ser. No. 11/240,695), the disclosures of which are incorporated herein by reference for all purposes.

In one example, the solid support of the present invention is formed by well known suspension polymerization techniques. In this example, the particles are typically derived from a monomer mixture, which is insoluble in the solvents with which they will be contacted. Exemplary substrates are formed by heating and stirring a suspension of monomers in a suitable solvent in the presence of a suitable emulsifying agent. Alternatively, the polymerization may be carried out by a suspension, bulk or solution process followed by grinding the resin to a desired size by mechanical means (e.g., ball mills, rod mills or the like).

The solid support can be of any form, including particulates (e.g., spherical, essentially spherical; e.g., resin beads), chips, chunks, blocks, monoliths and the like. When the substrate is in particulate form, the particles (e.g., irregular-shaped or bead-shaped, e.g., essentially spherical) have a median particle size (i.e., diameter). In one example, the median particle size of the substrate (e.g., spherical silica gel) is between about 0.1 (e.g., silica micro-spheres) and about 10,000 μm (microns). In one example, the median particle size of the substrate is between about 1 and about 5000 microns, between about 1 and about 1000 microns, between about 1 and about 500 microns, between about 1 and about 400 microns, between about 1 and about 300 microns, between about 1 and about 200 microns or between about 1 and about 100 microns. In yet another example, the median particle size of the substrate is between about 1 and about 80 microns, between about 1 and about 70 microns, between about 1 and about 60 microns, between about 1 and about 50 microns, between about 1 and about 40 microns, between about 1 and about 30 microns, between about 1 and about 20 microns or between about 1 and about 10 microns. In other example, the median particle size of the substrate particles is between about 10 and about 100 microns, between about 10 and about 80 microns, between about 40 and about 200 microns, between about 40 and about 100 microns, between about 40 and about 80 microns, between about 60 and about 200 microns, between about 60 and about 100 microns, between about 70 and about 200 microns, between about 80 and about 200 microns, between about 100 and about 200 microns, between about 200 and about 600 microns, between about 200 and about 500 microns or between about 200 and about 400 microns. In a particular example, the substrate is silica-based (e.g., silica gel) having a median particle size of between about 40 and 80 microns. The particle size can also be measured in "mesh" as defined on the Tyler Equivalent scale (the smaller the particle, the higher the mesh number). Typical mesh characteristics range between about 10 and 600. Generally, substrate particles useful in any packed bed chromatographic application (e.g., LC, HPLC or ultra-pressure chromatography) are suitable for use in the compositions of the invention.

In various examples, the support is in particulate form, and multiple support particles are disposed in a packed bed. For example, a plastic or metal column is packed with the support particles.

In other examples, the substrate particles are essentially "monodisperse" or essentially "homodisperse", which indicates that the particle size of the majority of the particles (e.g., 80, 90 or 95% of the particles) does not vary substantially (e.g., not more than 50%) below or above the median particle size (M). In an exemplary monodisperse substrate particle population, 90% of the particles have an average particle size of between about 0.5×M and about 1.5×M.

In another example, the substrate is an inorganic or organic monolith. In one example the solid support includes a silica monolith. In another example, the solid support includes an alumina monolith. In yet another example, the solid support includes a zirconia monolith. In a further example, the solid support includes a titania monolith. Exemplary monolithic materials based on organic compositions and methods of preparing such materials are described in U.S. Pat. Nos. 5,130,343; 5,929,214; 5,728,457; 5,260,094; 6,887,384; 5,334,310; 7,303,671; 5,453,185 and 7,074,331, the disclosures of which are incorporated herein by reference in their entireties for all purposes.

The pores of the substrate can have any size. In a typical substrate, the average pore size is equal to or smaller than the micro-particles, described herein below. The nominal pore size is typically measured in angstroms ($10^{-10}$ m, Å). In one example, the average diameter of the substrate pores is between about 1 and about 5000 Å. In another example, the volume average diameter of the substrate pores is between about 10 and about 5000 Å, between about 10 and about 4000 Å, between about 10 and about 3000 Å, between about 10 and about 2000 Å, between about 10 and about 1000 Å, between about 10 and about 800 Å, between about 10 and about 600 Å, between about 10 and about 400 Å, between about 10 and about 200 Å, between about 10 and about 100 Å, between about 20 and about 200 Å, between about 20 and about 100 Å, between about 30 and about 200 Å, between about 30 and about 100 Å, between about 40 and about 200 Å, between about 40 and about 100 Å, between about 50 and about 200 Å, between about 50 and about 100 Å, between about 60 and about 200 Å, between about 60 and about 100 Å, between about 70 and about 200 Å, between about 70 and about 100 Å, between about 80 and about 200 Å, between about 100 and about 200 Å, between about 100 and about 300 Å, between about 100 and about 400 Å, between about 100 and about 500 Å, between about 200 and about 500 Å or between about 200 and about 600 Å.

The specific surface area of the substrate is typically between about 0.1 and about 2,000 $m^2/g$. For example, the specific surface area of the substrate is between about 1 and about 1,000 $m^2/g$, between about 1 and about 800 $m^2/g$, between about 1 and about 600 $m^2/g$, between about 1 and about 400 $m^2/g$, between about 1 and about 200 $m^2/g$ or between about 1 and about 100 $m^2/g$ of resin. In another example, the specific surface area of the substrate is between about 3 and about 1,000 $m^2/g$, between about 3 and about 800 $m^2/g$, between about 3 and about 600 $m^2/g$, between about 3 and about 400 $m^2/g$, between about 3 and about 200 $m^2/g$ or between about 3 and about 100 $m^2/g$ of resin. In yet another example, the specific surface area of the substrate is between about 10 and about 1,000 $m^2/g$, between about 10 and about 800 $m^2/g$, between about 10 and about 600 $m2/g$, between about 10 and about 400 $m^2/g$, between about 10 and about 200 $m^2/g$ or between about 10 and about 100 $m^2/g$ of resin.

In one example, the substrate is not modified with a ligand but includes negatively or positively ionizable or charged groups. For example, silica gel carries negative surface charge above pH 4, and $Al_2O_3$ can have positive surface charge in acidic conditions and negative surface change in alkaline conditions. In another example, a polymeric organic substrate is made from monomers that provide ion-exchange groups and optionally hydrophobic moieties on the surface of the substrate. A monomer that can be used to prepare polymeric substrates or micro-particles with ion-exchange groups is acrylic acid. An exemplary substrate is a co-polymer of acrylic acid and one or more additional monomers. The resulting polymeric substrate will include carboxylic acid groups (cation exchange groups). Anion exchange groups, such as amines (anion exchange groups) may be introduced into a polymeric substrate by using monomers prepared from activated acrylic acid (e.g., acid chloride) and a diamine. Exemplary monomers according to this example include monomers related to N-(2-aminoethyl)acrylamide and N-(2-aminopropyl)acrylamide. Exemplary monomers include N-(2-(dimethylamino)ethyl)acrylamide and N-(2-(dimethylamino)propyl)acrylamide). Other monomers, which can be further modified either before or after polymerization to create a polymer with ion-exchange groups include glycidyl acrylate, glycidyl methacrylate, vinylbenzyl acetate, and 2-glycidyloxyethyl methacrylate, methyl acrylate, vinylbenzyl chloride, vinylbenzyl alcohol, vinylbenzyl glycidyl ether, 2-(4-vinylbenzyloxy)ethanol, 2-(4-vinylbenzyloxy)ethyl glycidyl ether. For example, the ester group of methyl acrylate can be hydrolyzed after polymerization to afford a polymer with carboxylic acid groups. In another example, the glycidyl group of the above listed monomers can be further modified by reaction with a nucleophilic ligand such as an amine or sulfhydryl-containing ligand. Methods for the modification of polymeric substrates are further discussed herein, below.

In preferred embodiments, the substrate is suitable for chemical modification with an organic ligand. In one example, the substrate is an organic polymeric substrate. Such substrates can be modified with an organic ligand by taking advantage of functional groups present on the polymer. Exemplary resins and methods of making such resins are described herein (e.g., Example 7). In one example, the polymer is a co-polymer of styrene and divinylbenzene (PS-DVB) functionalized with a ligand incorporating an amino group (see, e.g., Example 7.1.) or a carboxylic acid group (see, e.g., Example 7.2.). The ligand may be derived from a thiol-group containing precursor. The thiol analog may be heated with the polymer in the presence of a radical initiator, such as 2,2'-azobis(2-methylpropionitrile).

In another example, the substrate is an inorganic substrate, such as silica. Silica can be covalently modified using reactive silyl ligands.

Exemplary ligands and methods of their attachment to the substrate are described herein below.

Ligands

In various examples, the substrate (e.g., at least the inner lining of the substrate pores) is covalently modified with at least one type of organic ligand. In one example, the ligand includes at least one ion-exchange group, e.g., an ionizable or ionic group. Ion-exchange groups are described herein and include anionic, cationic, amphoteric and zwitterionic groups. Anion-exchange groups include primary, secondary, tertiary and quaternary amines, as well as any other proton-accepting functionalities. Cation exchange groups include sulfonates, sulfates, carboxylates, phosphonates, phosphates, silanols and any other proton-donating functionalities. Amphoteric and zwitterionic ligands include at least one anion-exchange and at least one cation-exchange group, each of which can be selected from the above described ion-exchange groups.

The ion-exchange ligands that are linked to the substrate form a functional (e.g., ion-exchange) layer (e.g., alongside the inner walls of the substrate pores) that is charged (either positively or negatively) under certain conditions. For example, under suitable pH conditions (e.g., pH below 7), a substrate functionalized with an anion-exchange ligand is positively charged.

Attachment of Ligands to the Solid Support

In one example, the solid support is functionalized using reactive ligands. For example, the reactive ligand (e.g., silyl ligand) includes a reactive functional group, useful for attachment to the solid support. The reactive functional group of the ligand is capable of reacting with the solid support (e.g., with complementary reactive functional groups on the surface of the solid support) to form one or more covalent bonds.

Attachment of Ligands to an Inorganic Solid Support

Methods for the attachment of ligands to inorganic substrates, such as silica substrates are known. Exemplary methods are described herein and, e.g., in WO2006/088760 (filed Feb. 10, 2006), WO2006/0054559 (filed Sep. 10, 2004), WO2005/047886 (filed Oct. 4, 2004), U.S. patent application Ser. No. 11/753,934 (filed May 25, 2007), H. Minakuchi et al., *Anal. Chem.* 1996, 68: 3498-3501, H. Minakuchi et al., *J. Chromatogr.* 1998, 797: 121-131 U.S. Pat. Nos. 6,248,798, 5,968,363, 5,865,994, 5,936,003 and 5,925,253, the disclosures of which are each incorporated herein by reference for all purposes.

In one example, the reactive ligand includes a reactive silyl group. For example, the reactive silyl group can react with the surface of a silica substrate comprising surface silanol (e.g., Si—OH) groups to create siloxane bonds between the silyl ligand and the silica substrate. In various embodiments, the reactive ligand includes an activated silyl group having a structure according to Formula (I):

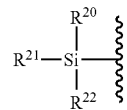

In exemplary silyl groups according to Formula (I), $R^{20}$, $R^{21}$ and $R^{22}$ are independently selected silyl group substituents. An activated silyl group includes at least one reactive silyl group substituent. A reactive silyl group substituent is capable of reacting with a substrate of the invention to form a covalent bond between the reactive ligand and the substrate. Thus, at least one of $R^{20}$, $R^{21}$ and $R^{22}$ is a reactive silyl group substituent. Exemplary reactive silyl group substituents include alkoxy groups, halogens, primary or secondary amino groups and carboxylic acid groups.

In one embodiment, $R^{20}$, $R^{21}$ and $R^{22}$ are members independently selected from halogen, $OR^{14}$, $NR^{14}R^{15}$, $OC(O)R^{16}$, $OS(O)_2R^{16}$, acyl, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. Each $R^{14}$ and each $R^{15}$ is a member independently selected from H, substituted or unsubstituted alkyl, substituted or unsubstituted heteroalkyl, substituted or unsubstituted aryl, substituted or unsubstituted heteroaryl and substituted or unsubstituted heterocycloalkyl.

Each $R^{16}$ is a member independently selected from substituted or unsubstituted alkyl, substituted or unsubstituted heteroalkyl, substituted or unsubstituted aryl, substituted or unsubstituted heteroaryl and substituted or unsubstituted heterocycloalkyl. In one embodiment, at least one of $R^{20}$, $R^{21}$ and $R^{22}$ is other than OH, unsubstituted alkyl, unsubstituted aryl, unsubstituted heteroaryl and unsubstituted heterocycloalkyl. In another embodiment, at least one of $R^{20}$, $R^{21}$ and $R^{22}$ is alkoxy or halogen. Exemplary reactive silyl groups useful for the covalently linkage of a reactive ligand to the solid support include:
—Si(OMe)$_3$; —SiMe(OMe)$_2$; —SiMe$_2$(OMe); —Si(OEt)$_3$; —SiMe(OEt)$_2$; —SiMe$_2$(OEt), —SiCl$_3$, —SiMeCl$_2$; —SiMe$_2$Cl, —SiCl$_2$(OMe), and —SiCl(OMe)$_2$.

In one example, one of $R^{20}$, $R^{21}$ and $R^{22}$ is a non-reactive silyl group substituent. In another example, two of $R^{20}$, $R^{21}$ and $R^{22}$ are non-reactive silyl group substituents. Exemplary non-reactive silyl group substituents include alkyl groups or aryl groups. In one embodiment, one or two of $R^{20}$, $R^{21}$ and $R^{22}$ are members independently selected from unsubstituted $C_1$-$C_6$ alkyl (e.g., methyl, ethyl, n-propyl, iso-propyl, n-butyl, iso-butyl and the like). In yet another example two of $R^{20}$, $R^{21}$ and $R^{22}$ are members independently selected from substituted or unsubstituted alkyl, such as substituted or unsubstituted $C_1$-$C_6$ alkyl (e.g., methyl, ethyl, n-propyl, iso-propyl, n-butyl, iso-butyl and the like). In a particularly embodiment, one or two of $R^{20}$, $R^{21}$ and $R^{22}$ are methyl.

In one example, the reactive ligand, which is used for covalent modification of the solid support includes an ion-exchange group. Alternatively, the reactive ligand includes a group, which can be converted to an ion-exchange group after coupling of the reactive ligand to the solid support. For example, the reactive ligand can contain a protected acidic group (e.g., a terminal ester group), which is de-protected to provide a free acid (e.g., carboxylic acid group) after coupling of the ligand to the solid support.

Any number of different ion-exchange and non-ion-exchange ligands can be bound to the solid support. In one example, the functional layer consists essentially of one type of ligand (anion-exchange or cation-exchange). In another example, the functional layer includes at least two different types of ligands independently selected from anion- and cation-exchange ligands. In another example, the functional layer includes at least two different types of ligands, wherein at least one ligand is an ion-exchange ligand (selected from anion- and cation-exchange ligands) and at least one ligand is a non-ionizable or non-ionic ligand. For example, in addition to the ion-exchange ligands, the compositions of the invention can further include reverse-phase (e.g., $C_8$ or $C_{18}$) ligands bound to the same solid support as the ion-exchange ligands. In yet another example, the functional layer includes at least two different types of ligands, wherein both ligands are anion-exchange ligands, or both ligands are cation-exchange ligands. In a further example, the functional layer includes at least two different types of ligands, wherein at least one ligand is an anion-exchange ligand and at least one ligand is a cation-exchange ligand.

The composition of the invention can include any type of ion-exchange ligand. The ligand includes at least one anion-exchange group and/or at least one cation-exchange group. Exemplary ion-exchange groups are described herein. In various examples, the ligand includes at least one of the following groups: —Z—OH, —(Z)$_n$N(R$^6$)(R$^7$), —(Z)$_n$N$^+$(R$^6$)(R$^7$)(R$^8$)X$^-$, —(Z)$_n$C(O)OR$^9$, —(Z)$_n$S(O)$_2$OR$^9$, —(Z)$_n$OP(O)(OR$^{10}$)(OR$^{11}$) and —(Z)$_n$B(OR$^{10}$)(OR$^{11}$)(OR$^{12}$), wherein n is an integer selected from 0 and 1. $R^6$, $R^7$ and $R^8$ are members independently selected from H, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. $R^9$ is a member selected from H, a single negative charge and a cationic counterion. $R^{10}$ and $R^{11}$ are members independently selected from H, a single negative charge, a cationic counterion, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. $X^-$ is either present or absent, and when present is an anionic counterion. Z is a member selected from substituted or unsubstituted aryl and substituted or unsubstituted heteroaryl.

The ligands can optionally include additional polar groups (e.g., ether, thioether, amide, sulfonamide, urea, thiourea, carbonate, carbamate, and the like).

The ligands can also include hydrophobic moieties (e.g., alkyl or aromatic moieties). The term "hydrophobic moiety" is defined herein. In one embodiment, the ligand has at least 3, at least 4, at least 5, at least 6, at least 7, at least 8, at least 9, at least 10, at least 11 or at least 12 carbon atoms in sequence, wherein at least two of the carbon atoms in sequence are optionally part of a substituted or unsubstituted ring (e.g., substituted or unsubstituted aryl, substituted or unsubstituted heteroaryl, or substituted or unsubstituted cycloalkyl). In one example, the hydrophobic moiety is sufficiently hydrophobic for the ligand to exhibit reversed phase characteristics. In this example, the ligand includes a reverse-phase moiety. Hence, in one example, the ligand includes at least 8, at least 9, at least 10, at least 11 or at least 12 carbon atoms in sequence. For example, when the ion-exchange ligands include a hydrophobic moiety, the resulting composition of the invention can provide reverse-phase capabilities in addition to ion-exchange capabilities. Such a material can, e.g., be used to analyze uncharged molecules in addition to ionic or ionizable analytes (e.g., within the same sample). The added reverse phase capabilities can be exploited to analyze samples containing organic hydrophobic and/or polar molecules in addition to ionic or ionizable molecules. Exemplary ligands and solid supports with reverse-phase moieties include ligands 9, 10, 11, 12, 13, 14, 15, 16, 17 and 18 (FIG. 2) and solid supports 27, 28, 29, 30, 31, 32, 33, 34, 35 and 36, respectively.

In an exemplary embodiment the ligand incorporates a moiety having a structure according to Formula (II), Formula (III), Formula (IV) or Formula (V), wherein m and n are integers independently selected from 0 and 1:

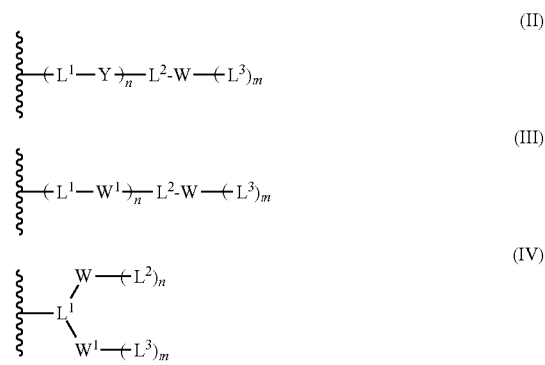

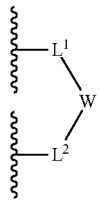

(V)

Ion-exchange Groups W

In exemplary ligands according to any of the above embodiments (e.g., in Formula (II), Formula (III), Formula (IV) or Formula (V)), W and $W^1$ are independently selected ion-exchange groups (e.g., ionic or ionizable groups). Exemplary ion-exchange groups are described herein, above. In one example, terminally disposed ion-exchange groups (e.g., "—W") [e.g., W in Formula (II) or (III) when m is 0, W in Formula (IV) when n is 0, $W^1$ in Formula (IV) when m is 0] are members independently selected from —Z—OH, —(Z)$_n$N(R$^6$)(R$^7$), —(Z)$_n$N$^+$(R$^6$)(R$^7$)(R$^8$)X$^-$, —(Z)$_n$C(O)OR$^9$, —(Z)$_n$S(O)$_2$OR$^9$, —(Z)$_n$OP(O)(OR$^{10}$)(OR$^{11}$) and —(Z)$_n$B(OR$^{10}$)(OR$^{11}$)(OR$^{12}$), wherein n is an integer selected from 0 and 1. In another example, internal (e.g., "—W—") ion-exchange groups [e.g., W in Formula (II) or (III) when m is 1, W in Formula (IV) when n is 1, $W^1$ in Formula (IV) when m is 1, W in Formula (V)] are members independently selected from —N(R$^6$)—, —N$^+$(R$^6$)(R$^7$)X$^-$—, —OP(O)(OR$^{10}$)O— and —B(OR$^{10}$)(OR$^{11}$)O—. $R^6$, $R^7$ and $R^8$ are members independently selected from H, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. $R^9$ is a member selected from H, a single negative charge and a cationic counterion. $R^{10}$ and $R^{11}$ are members independently selected from H, a single negative charge, a cationic counterion, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. $X^-$ is either present or absent, and when present is an anionic counterion. Z is a member selected from substituted or unsubstituted aryl and substituted or unsubstituted heteroaryl.

Polar Group Y

In one example, the ligand includes a polar group Y. For example, when in Formula (II) the integer n is 1, then the ligand includes Y. In exemplary ligands according to the any of the above embodiments, Y is a member selected from ether, thioether, amide, sulfonamide, carbonate, carbamate, urea or thiourea. For example, Y in Formula (II) can be any group useful to connect the two linker groups $L^1$ and $L^2$. In one embodiment, $L^1$ and $L^2$ are connected through an ether bond (e.g., Y is O), a thioether bond (e.g., Y is S), an amide (e.g., Y is —NHC(O)— or —C(O)NH—) or sulfonamide group (e.g., Y is —NHS(O)$_2$— or —S(O)$_2$NH—) or, alternatively, through a carbonate (e.g., Y is —OC(O)O—), carbamate (e.g., Y is —OC(O)NH— or —NHC(O)O—), urea (e.g., Y is —NHC(O)NH—) or thiourea group. In one embodiment, Y is an amide group: —C(O)NR$^{13}$— or NR$^{13}$C(O)—, wherein $R^{13}$ is a member selected from H, substituted or unsubstituted alkyl, substituted or unsubstituted heteroalkyl, substituted or unsubstituted aryl, substituted or unsubstituted heteroaryl and substituted or unsubstituted heterocycloalkyl. In a preferred embodiment, $R^{13}$ is hydrogen or lower alkyl, such as methyl.

Groups L

In exemplary ligands according to any of the above embodiments, for example, Formula (II), Formula (III), Formula (IV) or Formula (V), $L^1$, $L^2$ and $L^3$ are members independently selected from substituted or unsubstituted alkyl, substituted or unsubstituted heteroalkyl, substituted or unsubstituted aryl, substituted or unsubstituted heteroaryl, substituted or unsubstituted cycloalkyl, and substituted or unsubstituted heterocycloalkyl.

In one embodiment, the ligands of the invention include at least one hydrophobic moiety. In one example, at least one of $L^1$, $L^2$ and $L^3$ in the above formulae includes a hydrophobic moiety. For example, when in Formula (II) n is 1, at least one of $L^1$ and $L^2$ includes a hydrophobic moiety. In another example, when n is 0, $L^2$ includes a hydrophobic moiety. The term "hydrophobic moiety" is defined herein. The hydrophobic moiety may be included in an internal part of the ligand or can be found in the terminal part of a ligand, for example, $L^2$ in Formula (III).

Figure 3:
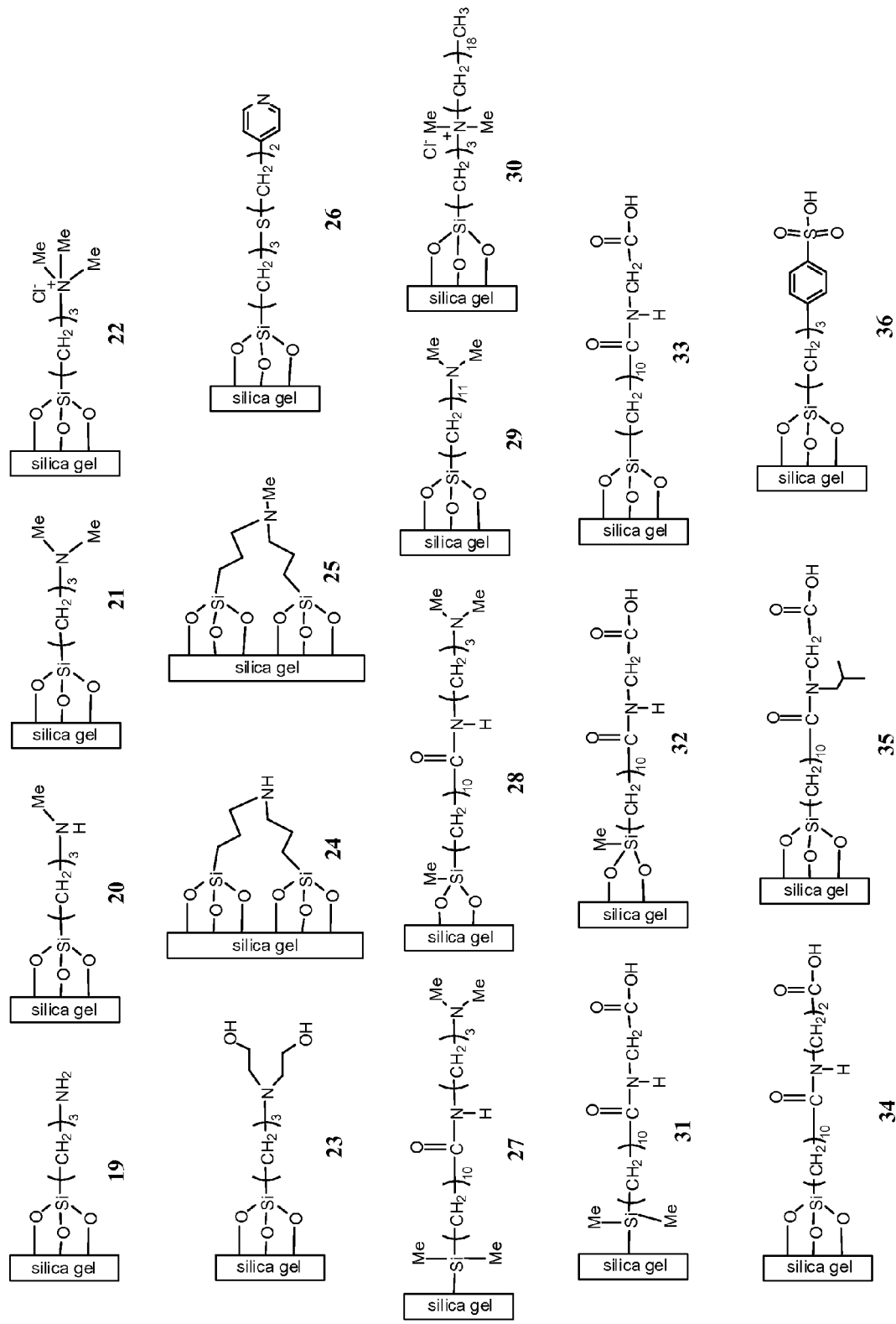
FIG. 3 illustrates exemplary functionalized supports (e.g., those incorporating ionizable or charged surfaces) useful for making the multi-mode materials of the invention.

Exemplary reactive silyl ligands of the invention are listed in FIG. 2. Exemplary substrate-bound ligands of the invention are listed in FIG. 3.

Additional reactive ligands, substrates and functionalized substrates useful in the present invention are disclosed e.g., in WO2006/088760 (filed Feb. 10, 2006), WO2006/0054559 (filed Sep. 10, 2004) and WO2005/047886 (filed Oct. 4, 2004), the disclosures of which are each incorporated herein by reference for all purposes.

Exemplary functionalized substrates of the present invention have a structure according to Formula (IIa), Formula (IIIa), Formula (IVa) and Formula (Va):

(IIa)

(IIIa)

(IVa)

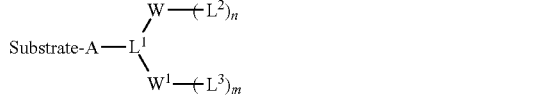

(Va)

wherein n, m, Y, W, $W^1$, $W^2$, $W^3$, $L^1$, $L^2$ and $L^3$ are defined as hereinabove. Each A is an independently selected linker group, which connects the ligand to the substrate (solid support) and is derived from the reactive functional group used to covalently link the ligand to the solid support. In one example, each A is an independently selected silyl group.

Hence, the invention provides compositions including a functionalized substrate incorporating a structure according to one of the following formulae:

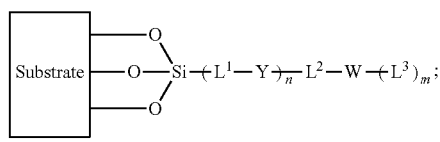

-continued

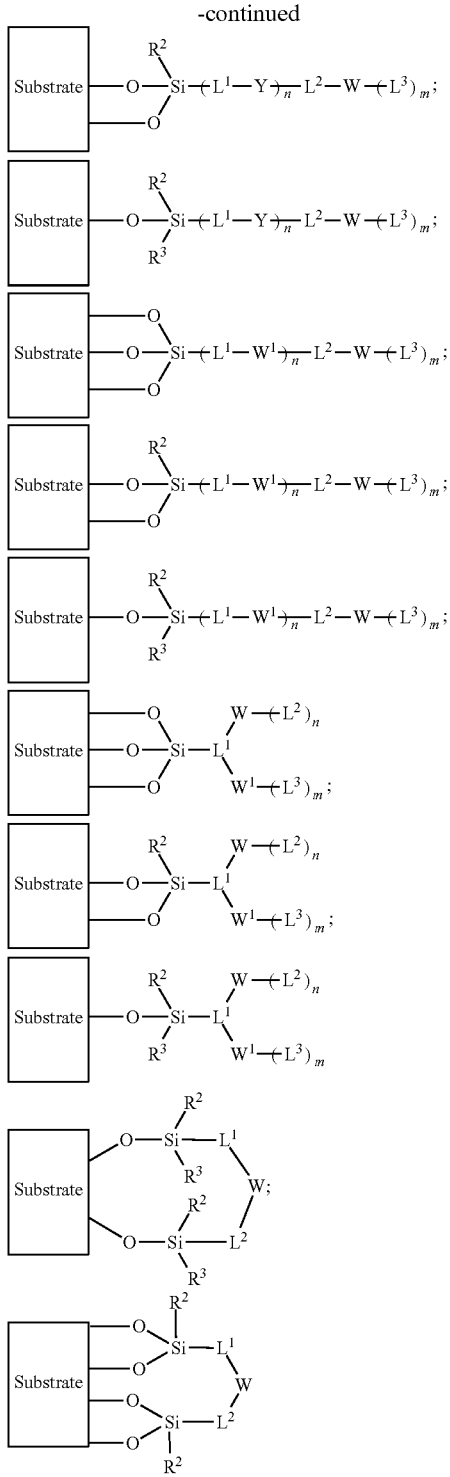

wherein n, m, Y, W, W¹, L¹, L² and L³ are defined as hereinabove. $R^2$ and $R^3$ are members independently selected from acyl, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. In one example, $R^2$ and $R^3$ are members independently selected from substituted or unsubstituted alkyl and substituted or unsubstituted aryl. In one embodiment, one or two of $R^2$ and $R^3$ are members selected from unsubstituted $C_1$-$C_6$ alkyl (e.g., methyl, ethyl, n-propyl, iso-propyl, n-butyl, iso-butyl and the like). In yet another example two of $R^2$ and $R^3$ are members independently selected from substituted or unsubstituted alkyl, such as substituted or unsubstituted $C_1$-$C_6$ alkyl (e.g., methyl, ethyl, n-propyl, iso-propyl, n-butyl, iso-butyl and the like). In a particularly embodiment, one or two of $R^2$ and $R^3$ are methyl. In another embodiment both of $R^2$ and $R^3$ are methyl.

Attachment of Ligands to an Organic (Polymeric) Solid Support

Methods for the attachment of ligands to organic substrates, such as polymeric resins are known to those of skill in the art. In one example, the substrate is prepared from monomers, which after polymerization provide unsaturated groups, such as vinyl groups. In one example, the polymer is a co-polymer of styrene and divinylbenzene (PS-DVB). The unsaturated groups (e.g., vinyl groups) of these resins can be used to attach an ion-exchange ligand. In one example, the ligand includes a thiol-group, which is added to the double bond via an addition mechanism involving radical intermediates, thereby forming a thio-ether bond between the ligand and the solid support. Such reactions are described, e.g., in WO/03022433 (filed Sep. 5, 2002). For example, anion exchange groups (e.g., amino groups) or cation exchange groups (e.g., carboxylic acid groups) are added to the solid support by heating (and/or treating with light) a vinyl-group containing resin (e.g., PS-DVB) with a reactive ligand incorporating a thiol group in the presence of a radical initiator, such as 2,2'-azobis(2-methylpropionitrile) (see, e.g., Example 7.1. and 7.2.). The ligand further includes at least one anion-exchange group (e.g., primary, secondary, tertiary or quaternary amino group), at least one cation exchange group, or at least one latent ion-exchange group, which can be converted to an ion-exchange group after linkage of the ligand to the solid support (e.g., an ester group, which is can be hydrolyzed, see, e.g., Example 7.2.). An exemplary method is illustrated in Scheme 1, below:

Scheme 1:

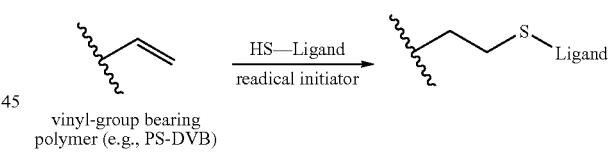

vinyl-group bearing polymer (e.g., PS-DVB)

Exemplary ligands useful in the above methods include:

wherein q is an integer selected from 1 to 50. In one example, q is a member selected from 1 to 18. In another example, q is a member selected from 1 to 10. In a particular example, q is 1. In one example, $R^a$, $R^b$ and $R^e$ are members independently selected from H, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. In another example, $R^a$, $R^b$ and $R^e$ are members independently selected from H and substituted or unsubstituted (C₁-C₄)alkyl. In a particular example, $R^a$ and $R^b$ are independently selected from H and methyl. In another particular example, $R^e$ is a member selected from methyl and ethyl. Each $R^c$ and each $R^d$ are members independently selected from H, hydroxyl, halogen, cyano, alkoxy, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl.

In another approach, the organic polymeric solid support incorporates a monomer that provides a reactive functional group, which can be used to covalently link an ion-exchange ligand to the solid support. In one example, the monomer incorporates a carboxylic acid group or an ester group, which can be hydrolized to form a carboxylic acid group after polymerization. Exemplary monomers according to this example include acrylic acid, methacrylic acid, alkyl (e.g.,methyl or ethyl) acrylates and alkyl (e.g., methyl or ethyl) methacrylates. The carboxylic acid group can be reacted with a complimentary reactive functional group on the ligand. In one example, the ligand includes an amino group, which can be reacted with the carboxylic acid group to form an amide bond between the solid support and the ligand. The carboxylic acid group can be activated, for example, by formation of an acid chloride prior to reaction with the reactive ligand.

In another example, the polymeric solid support incorporates a monomer that includes an epoxide group. The epoxide ring can be opened using a nucleophilic ligand thereby forming a covalent bond between the ligand and the solid support. For example, the ligand can include an amino group (e.g., a primary amino group) or a sulfhydryl group, which can react with the epoxide ring to form, e.g., an amine or a thio-ether linkage between the ligand and the solid support, respectively. Exemplary monomers that include an epoxide ring and can be incorporated into a polymer include glycidyl acrylate, glycidyl methacrylate, 2-glycidyloxyethyl methacrylate, vinylbenzyl glycidyl ether, 2-(4-vinylbenzyloxy)ethyl glycidyl ether. An exemplary method is illustrated in Scheme 2, below:

Scheme 2:

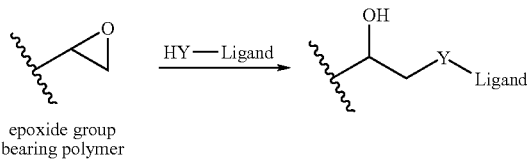

epoxide group
bearing polymer wherein YH is a nucleophic group, such as a sufhydryl group or a primary amino group. Y is a group derived from reaction of the nucleophilic group with the epoxide ring.

Exemplary nucleophilic ligands useful in the above methods include:

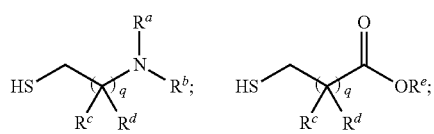

-continued

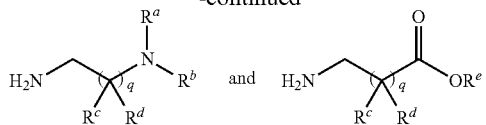

wherein q, $R^a$, $R^b$, $R^c$, $R^d$ and $R^e$ are defined as herein above.

In yet another example, the polymeric solid support incorporates a monomer that includes a leaving group, such as a halogen substituent, which can, e.g., be replaced with a nucleophilic ligand in a nucleophilic substitution reaction thereby forming a covalent bond between the ligand and the solid support. An exemplary monomer is vinylbenzyl chloride.

In a further example, the polymeric solid support incorporates a monomer that includes a hydroxyl group or a sulfhydryl group. The hydroxyl group can, e.g., be used to covalently link a ligand to the solid support via the formation of an ether-bond or a thio-ether bond, respectively. Exemplary monomers incorporating a hydroxyl group include vinylbenzyl alcohol and 2-(4-vinylbenzyloxy)ethanol.

Micro-particles

The micro-particles of the present invention can be formed from inorganic or organic material. The micro-particles may be formed from any known (e.g., synthetic) ion-exchange resin. Exemplary micro-particles include a polymeric material, such as a resin polymer (e.g., synthetic resin polymer). Resin polymers are known in the art and include latex and latex-derived materials. Exemplary micro-particles are disclosed in U.S. Pat. Nos. 5,324,752 and 5,532,279 to Barretto et al. and U.S. Pat. No. 4,376,047 to Pohl et al., the disclosures of which are each incorporated herein by reference for all purposes. In one example, the micro-particle includes a dendrimer.

The micro-particles of the present invention can be formed using known techniques and those described herein. In one example, the micro-particles are made using an emulsion polymerization technique. Exemplary micro-particles are formed by heating and stirring a suspension of at least one monomer in a suitable solvent in the presence of a suitable emulsifying agent. Alternatively, the polymerization may be carried out by a suspension, bulk or solution process followed by grinding the resin to a desired size by mechanical means, such as milling (e.g., ball mills, rod mills or the like). In one example, very fine particles (fines), which form during various polymerization procedures (and are often removed as a side-product), can be used as the micro-particles in the compositions of the invention.

In another example, the micro-particles are formed from cross-linked polymers. The micro-particles can, e.g., be formed from glycidyl acrylates, glycidyl methacrylates, poly (vinylaromatic) resins, such as styrene-divinylbenzene copolymer, divinylbenzene-vinylbenzylchloride copolymer, or methacrylate-vinylbenzylchloride copolymer, or divinylbenzene-vinylbenzylglycidylether (or acrylic epoxy type monomers) or other vinyl monomers containing epoxy substituents. Other exemplary micro-particles include monomers that incorporate reactive functional groups, such as reactive halides (e.g., vinylbenzylbromide or bromoethylmethacrylate) or anhydrides (e.g., co-polymers of maleic anhydride and divinylbenzene).

In one example, the micro-particle is a latex particle. Latex particles can be derived from latex emulsions. Methods for the preparation of micro-particles are known. Exemplary methods are described herein (see, e.g., Example 3) and in U.S. Pat. Nos. 5,936,003; 5,925,253; 5,532,279 and 5,324,752, each incorporated herein by reference for all purposes.

In one embodiment, the latex particles comprise a cross-linked polymer or copolymer containing about 0.25% to about 100% monomer by weight. In a preferred embodiment, the latex particles comprise a cross-linked polymer or copolymer containing between about 1% to about 5% monomer by weight.

In another example, the micro-particle is derived from inorganic material, such as silica, alumina, zirconia and titania. Exemplary methods for the preparation of inorganic micro-particles include those suitable for the preparation of inorganic substrates, known in the art. For example, silica particles with very small particle sizes have been described (e.g., those suitable for ultra-pressure chromatography). See, e.g., R. E. Majors, *LCGC* 2006, 24(S4); 8-15; R. E. Majors, *LCGC* 2008, 26(3): 8-15; and R. E. Majors, *LCGC* 2008, 26(S4): 10-17. The inorganic material can be functionalized with ion-exchange groups, e.g., via ion-exchange ligands (e.g., using reactive silyl ligands) as described herein for the functionalization of a solid support.

In various examples according to any of the above embodiments, the micro-particles include ion exchange groups (e.g., to create negative or positive charges). The charge associated with the ion-exchange groups on the surface of the particle can be used to attach the micro-particle (e.g., latex particles) to the solid support (e.g., silica) via electrostatic attachment (see e.g., U.S. Pat. No. 5,532,279 to Baretto et al., incorporated herein by reference). The ion-exchange groups may be derived from a monomer incorporated into the micro-particle during polymerization. In another example, the synthesis of the micro-particle yields a neutral surface. If the synthesis of the micro-particle yields a neutral surface, the micro-particles is further processed to add ion-exchange groups at least to the surface of the micro-particle, e.g., by covalently binding of organic ion-exchange ligands to the surface of the micro-particle. The ligands can optionally provide additional hydrophobic functionality. For example, the surface of the micro-particle is covalently functionalized with reactive ion-exchange ligands, e.g., in a manner described herein above for the modification of a polymeric organic substrate with organic ligands. In one example, the reactive ligand includes a thiol group and is covalently linked to the surface of a latex particle (e.g., via functionalization of an unsaturated moiety, such as a vinyl groups). Methods for the functionalization of organic polymeric resins are described hereinabove for the modification of the solid support. Each of those methods equally applies to the preparation of organic polymeric micro-particles.

The term ion-exchange group is defined herein. Exemplary ion-exchange groups are described herein above (e.g., in connection with the ligands) and those embodiments equally apply to the embodiments in connection with the micro-particles. Exemplary ion-exchange groups of the micro-particles include: —Z—OH, —(Z)$_n$N(R$^6$)(R$^7$), -(Z)$_n$N$^+$(R$^6$)(R$^7$)(R$^8$)X$^-$, —(Z)$_n$C(O)OR$^9$, -(Z)$_n$S(O)$_2$OR$^9$, -(Z)$_n$OP(O)(OR$^{10}$)(OR$^{11}$) and -(Z)$_n$B (OR$^{10}$)(OR$^{11}$)(OR$^{12}$), wherein n is an integer selected from 0 and 1. R$^6$, R$^7$ and R$^8$ are members independently selected from H, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. R$^9$ is a member selected from H, a single negative charge and a cationic counterion. R$^{10}$ and R$^{11}$ are members independently selected from H, a single negative charge, a cationic counterion, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl. X$^-$ is either present or absent, and when present is an anionic counterion. Z is a member selected from substituted or unsubstituted aryl and substituted or unsubstituted heteroaryl.

Size of the Micro-particles

The micro-particles (e.g., latex-particles) can have any size and shape. In one example, the micro-particles have a median diameter ranging from about 0.2 nm to about 1000 nm (1 μm). In another example, the micro-particles have a median diameter ranging from about 1 nm to about 900 nm, from about 1 nm to about 800 nm, from about 1 nm to about 700 nm, from about 1 nm to about 600 nm, from about 1 nm to about 500 nm, from about 1 nm to about 400 nm, from about 1 nm to about 300 nm, from about 1 nm to about 200 nm or from about 1 nm to about 100 nm. In yet another example, the micro-particles have a median diameter ranging from about 2 nm to about 100 nm, from about 4 nm to about 100 nm, from about 6 nm to about 100 nm, from about 8 nm to about 100 nm, or from about 10 nm to about 100 nm. In yet another example, the micro-particles have a median diameter ranging from about 10 nm to about 1000 nm, from about 10 nm to about 900 nm, from about 10 nm to about 800 nm, from about 10 nm to about 700 nm, from about 10 nm to about 600 nm, from about 10 nm to about 500 nm, from about 10 nm to about 400 nm, from about 10 nm to about 300 nm, or from about 10 nm to about 200 nm. In one example, the micro-particle is a latex-particle having an average particle size of between about 2 nm and about 90 nm. In a further example, the micro-particles have a median diameter of at least about 2 nm, at least about 4 nm, at least about 6 nm, at least about 8 nm, or at least about 10 nm. In another example, the micro-particles have a median diameter of at least about 20 nm, at least about 30 nm, at least about 40 nm, at least about 50 nm, at least about 60 nm, at least about 70 nm, at least about 80 nm, at least about 90 nm, or at least about 100 nm. In a further example, the micro-particles have a median diameter of at least about 200 nm, at least about 300 nm, at least about 400 nm, at least about 500 nm, at least about 600 nm, at least about 700 nm, at least about 800 nm, at least about 900 nm, or at least about 1000 nm.

Ratio Between Micro-particle Size and Pore Size

In one embodiment, the micro-particles have an average particle size equal to the average diameter of the substrate-pores. In another embodiment, the micro-particles have an average particle size larger than the average diameter of the substrate-pores (e.g., to essentially block the micro-particles from penetrating into the interior pores). In one example the ratio of the average diameter of the micro-particles (e.g., latex particles) to the average diameter of the substrate pores ranges between about 1:1 and about 1000:1. In one example the ratio of the average diameter of the micro-particles to the average diameter of the substrate pores ranges between about 1.2:1 and about 100:1, between about 1.4:1 and about 100:1, between about 1.6:1 and about 100:1, between about 1.8:1 and about 100:1, between about 2:1 and about 100:1, between about 4:1 and about 100:1, between about 6:1 and about 100:1, between about 8:1 and about 100:1, or between about 10:1 and about 100:1. In another example the ratio of the average diameter of the micro-particles to the average diameter of the substrate pores is at least about 1.2:1, at least about 1.4:1, at least about 1.6:1, at least about 1.8:1 or at least about 2:1. In a further example the ratio of the average diameter of the micro-particles to the average diameter of the substrate pores is at least about 3:1, at least about 4:1, at least about 5:1, at least about 6:1, at least about 7:1, at least about 8:1, at least about 9:1, or at least about 10:1. In another example the ratio of the average diameter of the micro-particles to the average diameter of the substrate pores is at least about 20:1, at least about 30:1, at least about 40:1, at least about 50:1, at least about 60:1, at least about 70:1, at least about 80:1, at least about 90:1, or at least about 100:1.

Ratio Between Particle-size and Micro-particle Size

In one example the ratio of the average diameter of the support particles to the average diameter of the micro-particles (e.g., latex particles) ranges between about 100:1 and about 5,000:1. Exemplary ratios are described in U.S. Pat. No. 4,376,047 to Pohl et al. (1983).

Attachment of the Micro-particles to the Solid Support

Exemplary methods for the attachment (binding) of latex particles to silica gel and silica monoliths are described in U.S. Pat. No. 5,532,279 to Barretto; U.S. Pat. No. 5,324,752, J. P. Hutchinson et al., J. Chromatogr. 2006, 1109: 10-18 and K. M. Glenn et al., J. Chromatogr. 2007, 1155: 8-14, the disclosures of which are incorporated herein by reference in their entirety for all purposes.

Exemplary methods for the direct or indirect electrostatic attachment (binding) of latex-particles to organic substrates are described in U.S. Pat. No. 4,927,539 to Stevens et al., U.S. Pat. No. 4,351,909 to Stevens et al., U.S. Pat. No. 4,519,905 to Stevens et al., U.S. Pat. No. 4,383,047 and U.S. Pat. No. 5,532,279 to Baretto et al., the disclosures of which are each incorporated herein by reference for all purposes.

In one example, the micro-particles are covalently bound to the exterior surface of the solid support. This can be accomplished by using complementary functional groups on the solid support and the micro-particles which can react with each other to form a covalent bond. Exemplary reactive functional groups include amines and carboxylic acid/carboxylic acid derivatives (e.g., activated esters and the like), which can be used to form amide bonds between the solid support and the micro-particles. In another example, click chemistry is used to covalently link the two components. In the above examples, the solid support and the micro-particles each provide a suitable functional group and are contacted with each other under conditions sufficient to form a covalent bond between them. Methods described herein above for the covalent linkage of ligands to the solid support and the micro-particles equally apply to the formation of covalent bonds between the micro-particles and the solid support.

In a particular example, the micro-particles are bound to the substrate by electrostatic force. For example, a slurry of the functionalized solid support (e.g., functionalized silica gel) in a suitable medium (e.g., aqueous medium) is contacted with a slurry of the functionalized micro-particles (e.g., functionalized polymer latex particles) under conditions sufficient for the micro-particles to bind to the surface of the support. The medium used to prepare the solid support slurry and the micro-particle slurry is preferably selected so that ion-exchange groups are charged. In one example, the medium is an aqueous medium, which is optionally adjusted to a suitable pH. For example, an anion-exchange support (e.g., having amino groups) is suspended in a buffer system (e.g., ammonium acetate) providing a slightly acidic pH (e.g., about pH 5). In another example, a cation-exchange support (e.g., silica functionalized with sulfonated ligands) is suspended in a buffer system (e.g., ammonium acetate buffer) having a pH that is sufficient to produce de-protonated acidic groups (e.g., about neutral or slightly basic pH).

In one example, the micro-particle slurry is used in a sufficient amount to provide an excess of micro-particles. In another example, the two slurries are mixed (e.g., using a mechanical stirrer or shaker) for a sufficient amount of time to obtain a desired degree of micro-particle loading. The reactants are mixed at a suitable temperature. In one example, the temperature is selected between about ambient temperature and about 40° C. The resulting mixture can then be filtered and the filter cake may be thoroughly washed and dried to afford a composition of the invention.

Electrostatic attachment of the micro-particles to the solid support can alternatively be accomplished through "on-column binding". For example, a column including the ion-exchange solid support (e.g., functionalized silica gel or silica monoliths) is connected to a pump (e.g., HPLC pump) and a solution or suspension of the micro-particles is pumped through the column under conditions sufficient for the micro-particles to bind to the surface of the support. During this procedure, the column is kept at a suitable temperature (e.g., ambient temperature). Micro-particles are pumped through the column for a sufficient amount of time to obtain a desired micro-particle loading of the column. In one example, micro-particles are pumped through the column until micro-particles are exiting the column indicating sufficient loading. For example, by monitoring the column effluent stream for breakthrough of micro-particles, such as latex derived particles, the completion of the micro-particle loading can be determined. The column used in this method can be a packed column or a monolith.

In one example, the micro-particles are attached to the exterior surface of the solid support by any method that essentially precludes removal of the micro-particles from the solid support under normal chromatographic conditions. For example, the micro-particles will essentially stay bound to the solid-support when subjected to strong electrolytes or shearing forces created when a liquid is passed through a bed of the chromatographic material provided by the invention. Such "irreversible" attachment methods include covalent binding, electrostatic attachment (e.g., salt-bridge formation between moieties of opposite charge), polymer entanglement, hydrogen bonding, combinations thereof and any other mechanism providing sufficient force to essentially prevent removal of the micro-particle from the solid-support during typical chromatographic conditions (e.g., typical LC, flash chromatography or HPLC). A person of skill in the art will appreciate that under certain conditions (e.g., very high flow rates, extreme temperature, high salt conductivities (e.g., above 5M NaCl), strong acidic or basic conditions) micro-particles can be removed from the solid-support. In addition, when the micro-particles are attached to the solid support non-covalently, even under normal chromatographic conditions, a small percentage of the micro-particles may be removed from the solid-support. However, such displacement does preferably not impart the function of the column.

In one embodiment, the micro-particles can be bound to the substrate indirectly. Indirect attachment may be accomplished via another layer of micro-particles. For example, a first layer of positively charged (e.g., aminated) latex-particles is bound to a negatively charged solid support (e.g., silica functionalized with cation-exchange groups) via electrostatic forces. A second layer of negatively charged latex particles (e.g., sulfonated latex particles) is then attached to the first layer via electrostatic forces. In another example, indirect attachment of the micro-particles can be accomplished via a dispersant, which is irreversibly bound to the solid support, e.g., covalently or via permanent entanglement as described by Barretto et al. in U.S. Pat. No. 5,532,279, incorporated herein by reference.

In another embodiment, the micro-particles are bound to a polymeric organic substrate of the invention via permanent physical entanglement, e.g., as described in U.S. Pat. No. 5,532,279 to Barretto et al., incorporated herein by reference.

Exemplary Compositions of the Invention

In one embodiment, the composition of the invention includes a porous silica substrate (e.g., silica gel or silica monolith) functionalized with either anion exchange ligands (e.g., ligands including amino groups) or cation exchange ligands (e.g., ligands including carboxylic acid or sulfonic acid groups). To the exterior surface of the silica substrate are bound latex particles incorporating ion-exchange groups of an opposite charge.

In one embodiment, a silica substrate (silica gel or silica monolith) is functionalized with anion-exchange ligands incorporating a primary, secondary, tertiary or quaternary amino group resulting in a silica anion-exchange substrate. To the exterior surface of the silica anion-exchange substrate are bound latex particles incorporating carboxylic acid and/or sulfonic acid groups. Exemplary compositions according to this embodiment are summarized in FIG. 10 (see, e.g., compositions 37 to 50g and 61). A person of ordinary skill in the art will appreciate that the exemplary amino-group bearing ligands/substrates of the compositions listed in the table of FIG. 10, can be substituted by any other amino-group bearing ligand/substrate, such as those incorporated herein by reference.

In another embodiment, a silica substrate (silica gel or silica monolith) is functionalized with cation-exchange ligands incorporating carboxylic acid and/or sulfonic acid groups resulting in a silica cation-exchange substrate. To the exterior surface of the silica anion-exchange substrate are bound latex particles incorporating an amino group. Exemplary compositions according to this embodiment are summarized in FIG. 10 (see, e.g., compositions 51 to 57 and 63). A person of ordinary skill in the art will appreciate that the exemplary carboxylic acid- or sulfonic acid-bearing ligands/substrates of the compositions in the table of FIG. 10 can be substituted by any other carboxylic acid- or sulfonic acid-bearing ligand/substrate, such as those incorporated herein by reference.

In another embodiment, the composition of the invention includes a porous polymeric organic substrate (e.g., a polystyrene divinylbenzene co-polymer) functionalized with either anion exchange ligands (e.g., ligands including amino groups) or cation exchange ligands (e.g., ligands including carboxylic acid or sulfonic acid groups). To the exterior surface of the silica substrate are bound latex particles incorporating ion-exchange groups of an opposite charge.

In one embodiment, a PS-DVB substrate is functionalized with anion-exchange ligands incorporating a primary, secondary, tertiary or quaternary amino group resulting in a PS-DVB anion-exchange substrate. To the exterior surface of the PS-DVB anion-exchange substrate are bound latex particles incorporating carboxylic acid and/or sulfonic acid groups. Exemplary compositions according to this embodiment are listed in FIG. 10 (compositions 65 and 65a). A person of ordinary skill in the art will appreciate that the exemplary amino-group bearing ligands/substrates of the compositions listed in the table of FIG. 10, can be substituted by any other amino-group bearing ligand/substrate, such as those incorporated herein by reference.

In another embodiment, a PS-DVB substrate is functionalized with cation-exchange ligands incorporating carboxylic acid and/or sulfonic acid groups resulting in a PS-DVB cation-exchange substrate. To the exterior surface of the PS-DVB cation-exchange substrate are bound latex particles incorporating primary, secondary, tertiary or quaternary amino groups. An exemplary compositions according to this embodiment is listed in FIG. 10 (composition 67). A person of ordinary skill in the art will appreciate that the exemplary carboxylic acid- or sulfonic acid-bearing ligands/substrates of the compositions in the table of FIG. 10 can be substituted by any other carboxylic acid- or sulfonic acid-bearing ligand/substrate, such as those incorporated herein by reference.

Columns

The current invention also provides embodiments, in which the compositions of the invention are contained in a container. The container is preferably a chromatography column. Exemplary chromatography columns include metal columns, glass columns and columns made from a polymeric material, such as plastics. Metal columns may be those commonly used for chromatography procedures employing high pressure (e.g., HPLC, ultra pressure). Plastic columns may be those commonly employed for preparative chromatography systems. Such polymeric columns are frequently disposable and are often referred to as cartridges. Hence, in one embodiment, the invention provides a chromatography column packed with a separation medium that includes a composition of the invention. In another example, the invention provides a chromatography column including a monolithic composition of the invention. In yet another example, the invention provides a composition of the invention in a flow-through bed suitable for use as a chromatographic medium.

IV. Methods

The compositions and compounds of the invention may be synthesized using methods known in the art and those described herein (see e.g., Examples 1 to 7). Variation of those methods may be necessary to synthesize compositions of certain embodiments. Those alternative methods will be apparent to a person of skill in the art. Starting materials and reagents useful for preparing the compositions and compounds of the invention are commercially available or can be prepared using art-recognized methodologies. Exemplary methods for the preparation of reactive silyl ligands and the preparation of exemplary functionalized substrates (e.g., those shown in FIG. 2 and FIG. 3) are provided e.g., in WO2006/088760 (filed Feb. 10, 2006), WO2006/0054559 (filed Sep. 10, 2004) and WO2005/047886 (filed Oct. 4, 2004), the disclosures of which are each incorporated herein by reference for all purposes. Other reactive silyl ligands are commercially available.

Generally, the compositions of the invention can be prepared as follows: When the synthesis of the porous substrate yields a material with ion-exchange groups at least on the surface (either with or without hydrophobic character), the material can be used for the next step. When the synthesis of the substrate yields a neutral surface, the substrate is covalently modified with ion-exchange ligands (either with or without hydrophobic character). Modification includes at least the surface pores. Separately, or in the presence of the substrate, the micro-particles are synthesized. Those particles can be used without further modification when their synthesis yields a material with ion-exchange groups at least on the surface (either with or without hydrophobic character). When the synthesis of the micro-particles yields a neutral surface, the micro-particles are modified with ion-exchange groups at least on the surface (either with or without hydrophobic character). When the synthesis of the micro-particles takes place separately, the substrate is subsequently contacted with the functionalized micro-particles.

Accordingly, the current invention further provides a method for making a composition of the invention, e.g., for the separation of analytes in a liquid sample. In one embodiment, the method includes: (a) bonding ion-exchange micro-particles, directly or indirectly, to an exterior surface of a porous solid support, wherein the solid support includes interior walls defining interior pores extending to openings in the exterior surface and wherein the interior walls are covalently functionalized with ion-exchange ligands. The ligands include at least one ion exchange group having a first charge (selected from positive and negative). The micro-particles include ion exchange groups having a second charge selected from positive and negative. The second charge is preferably opposite to the first charge. In certain embodiments, the average diameter of the micro-particles is equal to or larger than the average diameter of the pores. The above method can further include (b) covalently bonding organic ligands to the solid support including the interior walls.

Another exemplary method includes: (a) providing a porous solid support having an exterior surface and interior walls defining interior pores extending to openings in the exterior surface; (b) covalently bonding organic ligands to the interior walls. The ligands include at least one ion exchange group having a first charge (selected from positive and negative). The method further includes (c) bonding micro-particles, directly or indirectly, to the exterior surface of the solid support (e.g., irreversibly). The micro-particles include ion exchange groups having a second charge selected from positive and negative. The second charge is preferably opposite to the first charge. In certain embodiments, the average diameter of the micro-particles is equal to or larger than the average diameter of the pores.

Chromatographic Methods

The current invention further provides a chromatographic method (e.g., for separating analytes in a liquid sample). The method involves flowing a liquid through a monolith, or a packed bed of separation medium, that includes a composition of the invention. In one example, the liquid includes an analyte. For example, the liquid includes at least one type of anion (e.g., organic and/or inorganic anions) and at least one type of cation (e.g., organic and/or inorganic cations) each essentially retained by the separation medium. In another example, the liquid includes at least one type of anion (e.g., organic and/or inorganic anions), at least one type of cation (e.g., organic and/or inorganic cations) and at least one type of uncharged molecule (e.g., hydrophobic molecules, such as aromatic hydrocarbons), each essentially retained by the separation medium. In yet another example, the above method can be used to separate at least one type of anion (e.g., organic and/or inorganic anions) and at least one type of cation (e.g., organic and/or inorganic cations). (i.e., mobile phase)

In a further example, the above method can be used to separate at least one type of anion (e.g., organic and/or inorganic anions), at least one type of cation (e.g., organic and/or inorganic cations) and at least one type of uncharged molecule (e.g., hydrophobic molecules, such as aromatic hydrocarbons). The verb "to separate" or any grammatical version thereof, in this context, refers to at least two analytes eluting from a separation medium, each with a separate peak, preferably with baseline separation between the at least two peaks.

In one example, the mobile phase useful in the methods of the invention, includes water. The water content of the mobile phase is preferably between about 0.1% (v/v) and 100% (v/v), more preferably between about 1% and about 100% (v/v), even more preferably between about 10% and about 100% (v/v) and most preferably between about 20% and about 100% (v/v).

The invention further provides a method of separating analytes in a liquid sample comprising flowing said liquid sample through a chromatographic medium comprising a composition of the invention.

Each of the embodiments and examples outlined herein above for the compositions of the invention, equally apply to the methods of the invention. For example, each embodiment regarding the type of the solid support, the size of the solid support particles, the pore size, the structure and nature of the organic ion-exchange ligands, the type and size of the micro-particles, the type and nature of the ion-exchange groups and the type and nature of the hydrophobic moieties as outlined herein above, is equally applicable to the methods of the invention.

In one example, the method employs a composition that includes a porous solid support and micro-particles bound to the solid support. The composition includes cation-exchange groups, anion-exchange groups and reverse-phase moieties, wherein the cation-exchange and anion-exchange groups are sufficiently spaced from each other to avoid reaction between them. The reverse-phase moieties are provided by organic ligands covalently linked to the solid support.

In another example, the method employs a composition including: (a) a porous solid support. The porous solid support has an exterior surface and interior pores defined by interior walls. The pores extend to openings in the exterior surface. The composition further includes (b) organic ion-exchange ligands covalently bound to the solid support including the interior walls of the pores. In various examples, the ligands include ion-exchange groups optionally having a first charge (selected from positive and negative). The composition further includes (c) micro-particles (e.g., latex particles) including ion-exchange groups optionally having a second charge (selected from positive or negative), wherein the second charge is opposite to the first charge. The micro-particles are bound (e.g., via electrostatic attraction), either directly or indirectly (e.g., via additional layers of micro-particles) to the exterior surface of the solid support.

EXAMPLES

General: The preparation of the compositions of the invention can generally be divided into three independent steps:
(a) Preparation of a solid support with a charged surface
(b) Preparation of charged polymer latex particles
(c) Modification of the surface of the solid support with the polymer latex particles Example 1

Synthesis of Reactive Silyl Ligands with Ion-exchange Functionality

Reactive silyl compounds 1 to 8, 12 and 18 were purchased from Gelest. Compounds 9 and 10 are prepared by the method described in Example 1.1. Compound 11 was prepared by the method described in Example 1.2. Compounds 13 to 17 were prepared by the method described in Example 1.3.

1.1. Synthesis of Compound 9 (Exemplary Anion-exchange Ligand)

To a solution of (dimethylamino)propylamine and an excess of $Et_3N$ (2.0 equiv.) in $CH_2Cl_2$ kept at 0-5° C. for 20 min, was slowly added a solution of 10-undecenoyl chloride (1.0 equiv) in $CH_2Cl_2$. The reaction mixture was stirred at ambient temperature for 12 hours and was then washed with water and dried over $Na_2SO_4$. The solvent was removed under reduced pressure. The resulting intermediate was added to an excess of dimethylethoxysilane (10 equiv). To the mixture was added a catalyst (0.1 mol %), such as hexachloroplatinic acid in a minimum amount of ethanol. The reaction mixture was stirred at 50° C. for 24 hours. The excess of volatile silane and solvent were then removed under reduced pressure to yield compound 9.

1.2. Synthesis of Compound 11 (Anion-exchange Ligand)

At 5° C. a solution of 11-bromo-1-undecene in THF was added dropwise to a solution of dimethylamine (10 equiv) in THF. The reaction mixture was stirred at ambient temperature for 12 h. The volatiles were removed in vacuo. The crude intermediate was purified by $CH_2Cl_2/H_2O$ extraction and dried over $Na_2SO_4$. Volatiles were removed in vacuo to afford an allyl intermediate. An excess of dimethylethoxysilane (10 equiv.) was then added to the intermediate followed by addition of a solution of catalyst (0.1 mol %) (e.g., hexachloroplatinic acid in a minimum amount of ethanol). After stirring at 50° C. for 24 h, the silane and solvent were removed in vacuo to provide silyl compound 11.

1.3. Synthesis of Compound 14 (Cation-exchange Ligand)

To a solution of glycine methyl ester hydrochloride (1.1 equiv), triethylamine (3 equiv) in $CH_2Cl_2$ (500 mL) at a temperature below 5° C., under nitrogen was slowly added a solution of 10-undecenoyl chloride (1 equiv) in $CH_2Cl_2$ (300 mL) over 4 hours. The reaction mixture was stirred at ambient temperature for 12 h. The solid was filtered off. To the filtrate was added water and the product was extracted with dichloromethane. The combined organic phases were dried over $MgSO_4$. Volatiles are removed in vacuo. The crude product was purified by Kugelrohr distillation at 160° C./0.06 Torr.

To a solution of the above allyl intermediate (1.0 equiv) and $(MeO)_2MeSiH$ (1.5 equiv) at ambient temperature was carefully added a Pt(0) catalyst (0.1 % wt) (note: occasionally, an exothermic reaction is observed). The reaction mixture was then warmed to 95° C. and kept at that temperature for 16 h. Volatiles were then removed at reduced pressure to give the compound 14.

Example 2

Synthesis of Functionalized Solid Supports

Reactive silanes bearing ion-exchange functionalities can be covalently attached to a variety of substrates, such as silica gel, glass plates, alumina, zirconia and the like. The silica gel can be porous silica with various pore sizes, preferably from about 60 Å to about 5000 Å. The reaction can be carried out in a slurry of silica gel and an inert solvent, such as toluene, at elevated temperature. Addition of water, acid or base may catalyze the reaction to enhance surface coverage depending on the intended application for the resulting material. Examples of functionalized substrates, which are useful in the compositions and methods of the invention, are listed in FIG. 3.

2.1. Preparation of Solid Support 27 with Aminated Surface

A solution of silyl ligand 9 (75 g) in toluene (250 mL) was added to dried silica gel (150 g). After carefully dispersing the above slurry, the reaction mixture was stirred and refluxed for 48 h. The functionalized silica particles are filtered off and thoroughly washed with acetone to give the solid support 27.

2.2. Preparation of Solid Support 32 with Carboxylated Surface

A solution of silyl ligand 14 (150 g) in toluene (450 mL) was added to dried silica gel (150 g). After carefully dispersing above slurry, the reaction mixture was refluxed and stirred for 72 h. The functionalized silica particles were filtered off and thoroughly washed. The intermediate was hydrolyzed using 0.1% aqueous phosphoric acid for 3 h. The particles were again filtered off and washed thoroughly with acetone to give the solid support 32.

Example 3

Preparation of Charged Polymer Latex Particles 3.1. Preparation of Aminated Latex Particles A mixture of 32 g of vinylbenzylglycidylether (VBGE) and 2.7 g of 80% divinylbenzene (DVB) was added to 308 g of an aqueous solution containing 4.0 g of 70% Triton X-405 (a nonionic ethoxylated alkylphenol), 2.1 g of potassium persulfate, and 15 g of 8% potassium metabisulfite solution. The mixture was de-airated with nitrogen for 20 minutes. The bottle was capped and tumbled in a water bath held at 32° C. for 18 hours to complete the polymerization. To the resulting latex were then added 19.2 g of a 70% Triton X-405 solution in order to stabilize it. The white opaque mixture was filtered through a GF/A glass fiber filter paper to remove any coagulum and to afford 336 g of latex.

To 336 g of the above latex was added a mixture of 62.4 g of 1M nitric acid and 91.2 g of 5M methyldiethanol amine to form aminated, quaternized latex. The mixture was stirred for 10 minutes. An additional mixture of 144 g of 1M nitric acid and 384 g of 5M methyldiethanol was added and stirring was continued for 12 hours at 50° C. to give amonated vinylbenzylglycidyl ether/divinylstyrene copolymer (6% crosslinking, dp: 70 nm).

3.2. Preparation of Sulfonated Latex Particles

To a de-airated solution of 0.1 g calcium chloride dihydrate in water (350 g) under nitrogen was added a mixture of 21.66 g styrene, 1.42 g commercial 80.5% divinylbenzene, 0.14 g of Vazo 33 (2,2'-azobis (2,4-dimethyl-1-4-methoxyvaleronitrile), 3.66 g of Atlox 3403 F (blend of anionic and nonionic surfactants) and 1.09 g Atlox 3404 F. The bottle was capped and tumbled at 32° C. for 17 hours. To the mixture was then added 22 g of Igepal DM880 (ethoxylated dialkylphenol). The bottle was again capped and tumbled for 24 hours at 32° C. The reaction mixture was filtered using Whatman's GF/A, GF/D and GF/F filters to remove any coagulum from the latex.

The latex was sulfonated by adding 92.4 g of concentrated sulfuric acid to 20 g of the filtered latex. To the mixture were added chlorosulfonic acid (137 g). The mixture was heated at 110° C. for 2 hours and was then cooled to 60° C. The cooled mixture was added to 3.22M sodium hydroxide (1800 ml) to quench the sulfonation of the latex. The quenched latex was filtered using a Whatman #541 filter to remove coagulum to give sulfonated 4-methylstyrene/divinylstyrene copolymer (5% crosslinking, dp: 150 nm).

3.3. Preparation of Carboxylated Latex Particles

To an aqueous solution (228 g) containing 2.9 g potassium dihydrogen phosphate, 5.8 g of disodium hydrogen phosphate heptahydrate, 4.7 g of 70% solution Triton X-405 (a nonionic ethoxylated alkylphenol), 1.44 g of potassium persulfate, and 10.8 g of a 7.4% solution of potassium metabisulfite was added glycidyloxyethyl methacrylate (GLEMA) (24 g). The mixture was deairated with nitrogen for fifteen minutes. The bottle was capped and tumbled in a water bath at 32° C. for 16 hours to complete the polymerization. To the mixture were added 12 g of a 70% Triton X-405 solution in order to stabilize the resulting latex. The white opaque mixture was filtered through a GF/A glass fiber filter paper to remove any coagulum to give 269 g of latex.

To the above latex (5 g) was added 1M nitric acid (1.2 g) to adjust the pH to approximately pH 3. A solution of thioacetic acid (sodium salt) (or thiomalic acid, or S-corboxymethyl-L-cysteine) in DI water (5 g) was added in two aliquots (2.5 gram each) with stirring for 1 hour at 52° C. after adding the first aliquot.

Example 4

Preparation of Mixed-Mode Stationary Phases with Cation- and Anion-Exchange Properties First, a slurry of the functionalized solid support (e.g. materials 19 to 36) in a suitable aqueous medium was prepared. The aqueous medium is selected to ensure that the ion-exchange groups are charged. Separately, a slurry of polymer latex particles with opposite charge is adjusted to a proper pH and diluted if needed. Finally, these two slurries are mixed (e.g., using a mechanical stirrer or shaker) for a certain amount of time. The resulting mixture is then filtered and the filter cake is thoroughly washed and dried to afford a composition of the invention. Exemplary compositions, which can be prepared using the above general method are listed in FIG. 10.

4.1. Preparation of Material 45 (Positively Charged Solid Support Coated with Sulfonated Latex Particles)—Off-column Procedure 10 g of the positively charged silica particles (material 27 of Example 2.1) is dispersed in 100 mL of ammonium acetate buffer (100 mM, pH 5). Separately, 100 mL of sulfonated latex (Example 3.2) were adjusted to pH 4-5 with ammonium acetate buffer (2 M, pH5.4). The silica particles and the sulfonated latex mixture were combined and the resulting mixture was stirred at ambient temperature for 3 h. The functionalized silica particles were filtered off and thoroughly washed with D.I. water followed by acetone to give the packing material 45.

4.2. Preparation of Material 50 (Negatively Charged Solid Support Coated with Aminated Latex Particles)—In-column Procedure A 50 mm by 4.6 mm (i.d.) 316 stainless steel HPLC column housing was packed with material 32 (of Example 2.2.) using a high-pressure slurry packing technique. Separately, 10 mL of an aminated latex solution (of Example 3.1.) was adjust to pH 7-8 with a phosphate buffer (0.2 M, pH7 to 8). The latex solution was transferred into a 250-mL HPLC eluent bottle. A HPLC pump was used to wash the packed column with a phosphate buffer (0.2 M, pH 7) at 0.5 mL/min for 30 min. The column was then purged with the latex solution at 0.5 mL/min until the latex particles were observed flowing out the exit of the column. Finally, the column was washed with phosphate buffer (0.2 M, pH7), D.I water, and 70% acetonitrile in D.I. water to afford a column packed with material 50.

4.3. Preparation of Material 57 (Unfunctionalized Silica Gel Particles Coated with Aminated Latex Particles)

A 10 mm×4.3 mm (i.d.) 316 HPLC column guard cartridge housing was packed with unfunctionalized silica particles using a vacuum slurry packing technique. Separately, 10 mL of aminated latex solution (Example 3.1.) was adjust to pH 7-8 with a phosphate buffer (0.2 M, pH7 to 8). The latex solution was transferred into a 250-mL HPLC eluent bottle. A HPLC pump was used to wash the packed column with a phosphate buffer (0.2 M, pH7) at 0.5 mL/min for 50 min. The column was then purged with the latex solution at 0.5 mL/min until latex particles were exiting of the column. Finally the column was washed with phosphate buffer (0.2 M, pH7), D.I water, and 70% acetonitrile in D.I. water to afford a column packed with material 50.

4.4. Preparation of Material 58 (Unfunctionalized Aluminum Oxide Particles Coated with Sulfonated Latex Particles)

10 g of unfunctionalized basic aluminum oxide were dispersed in 0.1% aqueous phosphoric acid. Separately, 100 mL of sulfonated latex (Example 3.2.) was adjusted to pH 7 with a phosphate buffer (100 mM, pH 7). The aluminum oxide and the latex particles were mixed and the resulting mixture was stirred at ambient temperature for 3 h. The functionalized aluminum oxide particles were then filtered off and thoroughly washed with D.I. water and acetone to give packing material 58.

4.5. Preparation of Material 59 (Unfunctionalized Aluminum Oxide Particles Coated with Aminated Latex Particles)

10 g of unfunctionalized acidic aluminum oxide particles were dispersed in a phosphate buffer (100 mM, pH7). Separately, 100 mL of aminated latex (Example 3.1.) were adjusted to pH 7 with a phosphate buffer (100 mM, pH 7). The aluminum oxide particles and the aminated latex particles were combined and the resulting mixture was stirred at ambient temperature for 3 h. The functionalized silica particles were filtered off and thoroughly washed with D.I. water and acetone to give packing material 59.

Example 5

Chromatographic Application of the Mixed-mode Media

This section describes the chromatographic evaluation of selected compositions of the invention. Samples were prepared from high purity raw silica gel with the following physical properties: average particle size: 5.0 µm; specific surface area: 300 m$^2$/g; average pore size: 120 Å; pore volume: 1.00 mL/g. The bonded silica was packed into stainless steel columns using known high-pressure slurry techniques.

5.1. Simultaneous Separation of Inorganic Cations and Inorganic Anions

A 50 mm×3.0 mm (i.d.) 316 stainless steel HPLC column housing was packed with material 45 (Example 4.1.) using high-pressure slurry packing technique. A test-mixture was injected onto the column. The test mixture contained LiCl, NaCl and KCl (2 mM each). The test conditions were as follows:
Eluent: $CH_3CN$/D.I. $H_2O$/100 mM $NH_4OAc$, pH 5 (50:40:10 v/v/v)
Flow rate: 0.425 mL/min;
Injection volume: 5 µL;
Temperature: 30° C.;
Detection: ELSD.

Figure 4:
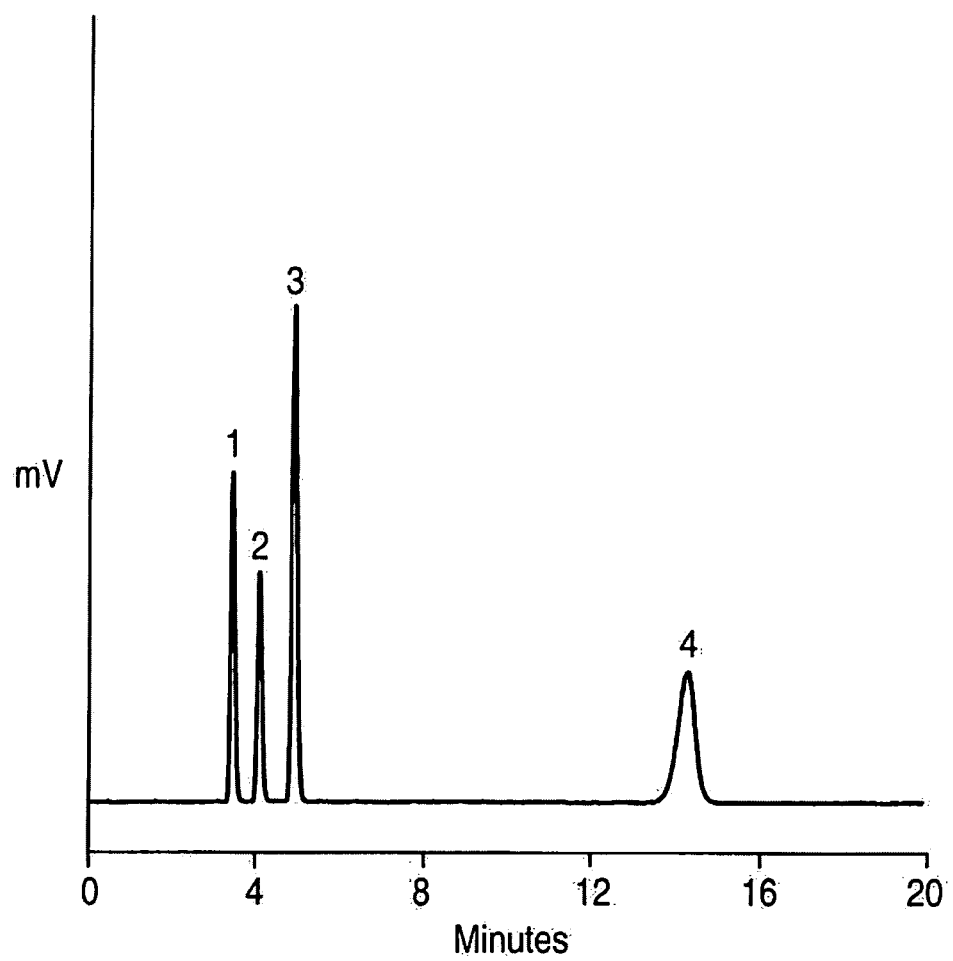
FIG. 4 is a chromatogram illustrating the simultaneous separation of inorganic cations and inorganic anions using a column packed with composition 45 (e.g., 5 μm, 3×50 mm). The analyzed sample included 2 mM $Li^+$ (1), 2 mM $Na^+$ (2), 2 mM $K^+$ (3) and 6 mM $Cl^-$ (4). The conditions were as follows: mobile phase: 50/40/10 v/v/v $CH_3CN/H_2O$/100 mM $NH_4OAc$, pH 5; temperature: 30° C.; flow rate: 0.425 mL/min; injection volume: 5 μL; detection: ELSD.

The resulting chromatogram of the above analysis is shown in FIG. 4. The results indicate that material 45 can be used to separate and analyze inorganic cations and inorganic anions. Material 45 provides reversed phase, weak anion-exchange (provided by covalently aminated silica gel shown in FIG. 3, composition 27) and strong cation-exchange (provided by sulfonated latex coating) retention machanisms. By comparison, neither conventional reversed-phase columns nor ion-exchange columns can provide the same separation. In addition, the selectivity of material 45 can be adjusted by changing the pH, the ionic strength, the salt types, and the organic composition of the mobile phase.

5.2. Simultaneous Separation of Organic Cations and Inorganic Anions

The above column (Example 5.1.) containing composition 45 was used for the following chromatographic evaluation. A test mixture containing $NMe_4Cl$, $NEt_4Cl$, $NPr_4Br$, and NBu₄Br (200 ppm each) was injected onto the column. The test conditions were as follows:

Eluent: $CH_3CN$/D.I. $H_2O$/200 mM $NH_4OAc$, pH 5 (v/v/v) from 40/57.5/2.5 to 40/40/20 in 5 min, then to 40/10/50 in 10 min;
Flow rate: 0.425 mL/min;
Injection volume: 2 µL;
Temperature: 30° C.;
Detection: ELSD.

Figure 5:
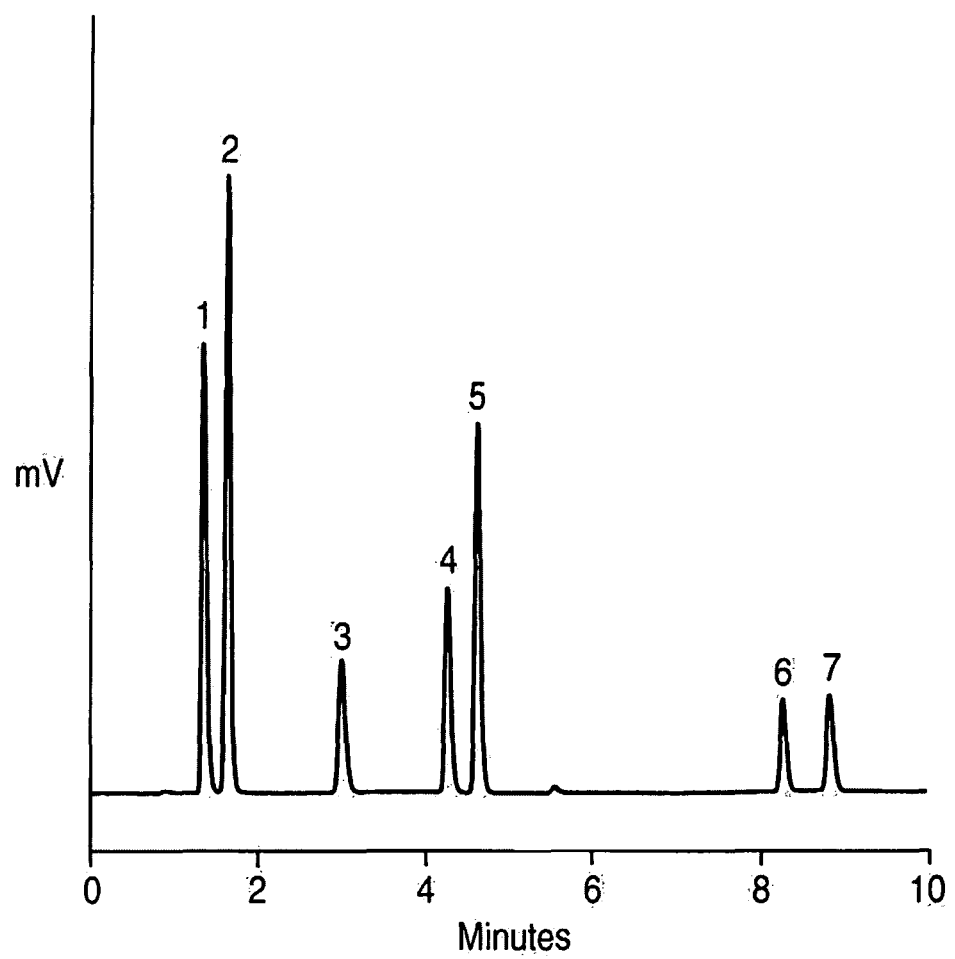
FIG. 5 is a chromatogram illustrating the simultaneous separation of organic cations and inorganic anions using a column packed with composition 45 (e.g., 5 μm, 3×50 mm). The analyzed sample included tetrapentylammonium [$N^+$ $(CH_2CH_2CH_2CH_2CH_3)_4$](1), tetrabutylammonium [$N^+$ $(CH_2CH_2CH_2CH_3)_4$](2), tetrapropylammonium [$N^+$ $(CH_2CH_2CH_3)_4$] (3), tetraethylammonium [$N^+(CH_2CH_3)_4$] (4), tetramethylammonium [$N^+(CH_3)_4$] (5), chloride (6) and bromide (7) at a concentration of approximately 200 ppm each. The conditions were as follows: gradient: $CH_3CN/H_2O$/200 mM $NH_4OAc$, pH5 v/v/v from 40/57.5/2.5 to 40/40/20 over 5 min, then to 40/10/50 over 10 min; temperature: 30° C.; flow rate: 0.425 mL/min; injection volume: 2 μL; detection: evaporative light-scattering detector (ELSD).

Results for the above analysis are illustrated in FIG. 5. The figure shows that the four alkyl quaternary amines and their inorganic anionic counter ions can be simultaneously retained and separated on a column packed with mixed-mode material 45.

5.3. Simultaneous Separation of Cationic, Anionic and Neutral Organic Compounds (Using Composition 45)

A 4.6×50 mm HPLC column packed with material 45 subject to the following chromatographic evaluation. The test mix contains pseudoephedrine (200 ppm), naphthalene (100 ppm) and salicylic acid (50 ppm). The test conditions were as follows:

Gradient: $CH_3CN$/D.I. $H_2O$/0.2 M NaCl/0.1% $H_3PO_4$ in D.I. $H_2O$=40/40/10/10 (v/v/v/v);
Flow rate: 1 mL/min;
Injection volume: 2 µL;
Temperature: 30° C.;
Detection: UV at 210 nm.

Figure 6:
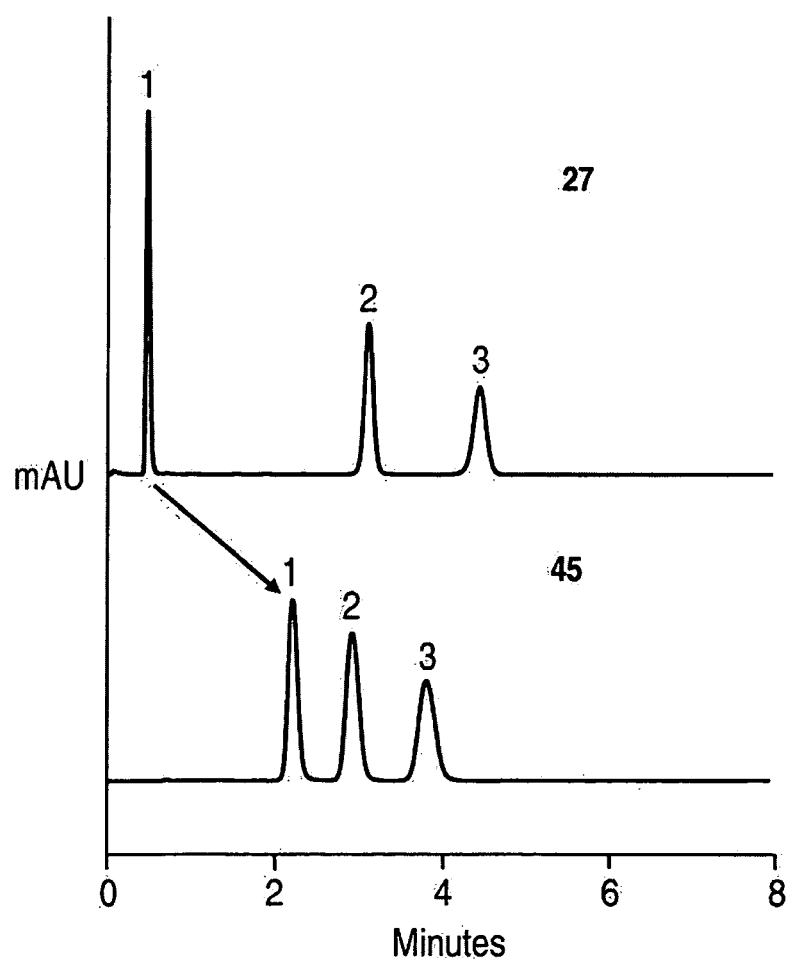
FIG. 6 is a set of two chromatograms illustrating the simultaneous separation of cationic, anionic and neutral organic compounds using columns packed with composition 45 (e.g., 5 μm, 4.6×50 mm) and silica functionalized with ion-exchange ligand 27. The analyzed sample included pseudoephedrine (1), naphthalene (2) and salicylic acid (3). The conditions were as follows: mobile phase: $CH_3CN/H_2O$/0.2 M NaCl/0.1% $H_3PO_4$ v/v/v 40/40/10/10; temperature: 30° C.; flow rate: 1 mL/min; injection volume: 2 μL; detection: UV at 210 nm.

Results for the above analysis are shown in FIG. 6. The figure indicates that mixed-mode composition 45 can retain and separate cationic, neutral and anionic organic molecules in a single chromatographic run. By comparison, the cationic molecule pseudoephedrine (compound 1 in FIG. 6) elutes in the void volume when injected onto a column packed with the positively charged solid support precursor (material 27) because of the electrostatic repulsion between the cationic analyte and the positively charged surface.

5.4. Simultaneous Separation of Cationic, Anionic and Neutral Organic Compounds (Using Composition 52)

A test mix containing pseudoephedrine (200 ppm), naphthalene (100 ppm) and salicylic acid (50 ppm) was analyzed using a 4.6×50 mm HPLC column packed with composition 52. The test conditions were as follows:

Gradient: $CH_3CN$/5 mM potassium phosphate buffer, pH6.8=45/55 (v/v);
Flow rate: 1 mL/min;
Injection volume: 1 µL;
Temperature: 30° C.;
Detection: UV at 210 nm.

Figure 7:
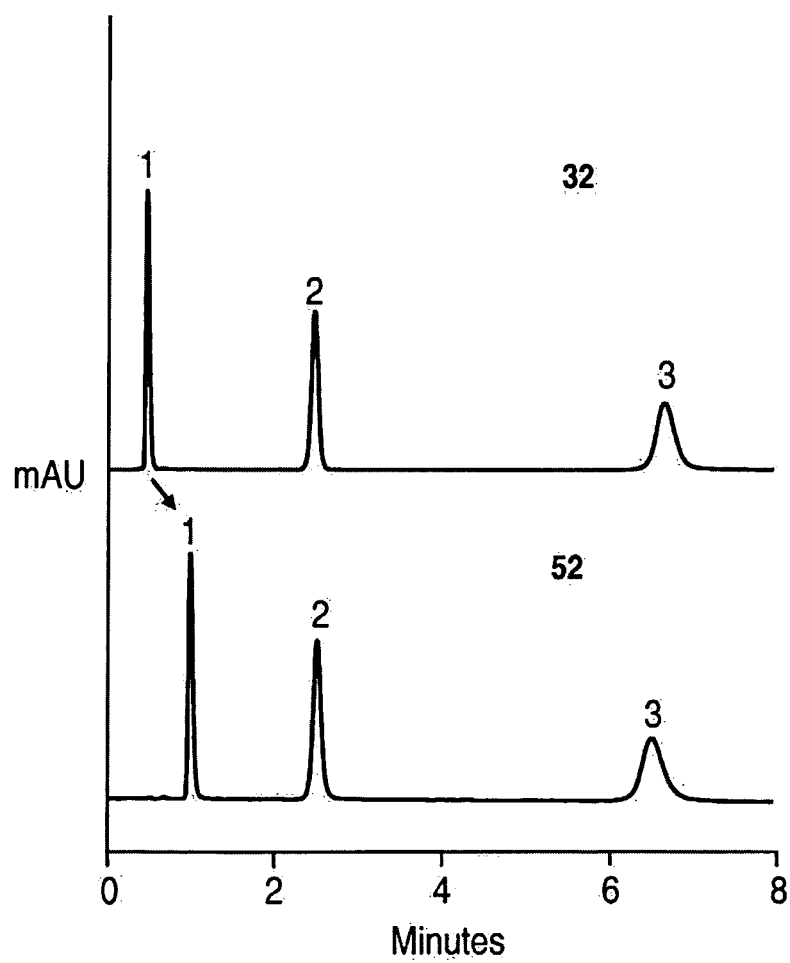
FIG. 7 is a set of two chromatograms illustrating the simultaneous separation of cationic, anionic and neutral organic compounds using columns packed with composition 52 (e.g., 5 μm, 4.6×50 mm) and silica functionalized with ion-exchange ligand 32. The analyzed sample included salicylic acid (1), naphthalene (2) and pseudoephedrine (3). The conditions were as follows: mobile phase: $CH_3CN$/5 mM potassium phosphate buffer, pH 6.8 v/v 45/55; temperature: 30° C.; flow rate. 1 mL/min; injection volume: 1 μL; detection: UV at 210 nm.

Results for the above analysis are shown in FIG. 7. The figure indicates that mixed-mode material 52 can be used to retain and separate anionic, neutral and cationic organic molecules in a single chromatographic run. By comparison, the anionic molecule, salicylic acid (compound 1 in FIG. 7), elutes in the void volume when injected onto a column packed with the negatively charged solid support precursor (material 32) because of the electrostatic repulsion between the anionic analyte and the negatively charged surface. In addition, the selectivity of the prototype column packed with 52 can be adjusted by changing mobile phase pH, ionic strength, and organic composition.

5.5. Simultaneous Retention of Cationic and Anionic Organic Compounds (Using Composition 57)

A test mixture containing pseudoephedrine (200 ppm), naphthalene (100 ppm) and salicylic acid (50 ppm) was analyzed using a 4.3×10 mm HPLC column packed with material 57. The test conditions were as follows:

Gradient: $CH_3CN$/5 mM NaCl aqueous solution 40/60 (v/v);
Flow rate: 1 mL/min;
Injection volume: 1 µL;
Temperature: 30° C.;
Detection: UV at 210 nm.

Figure 8:
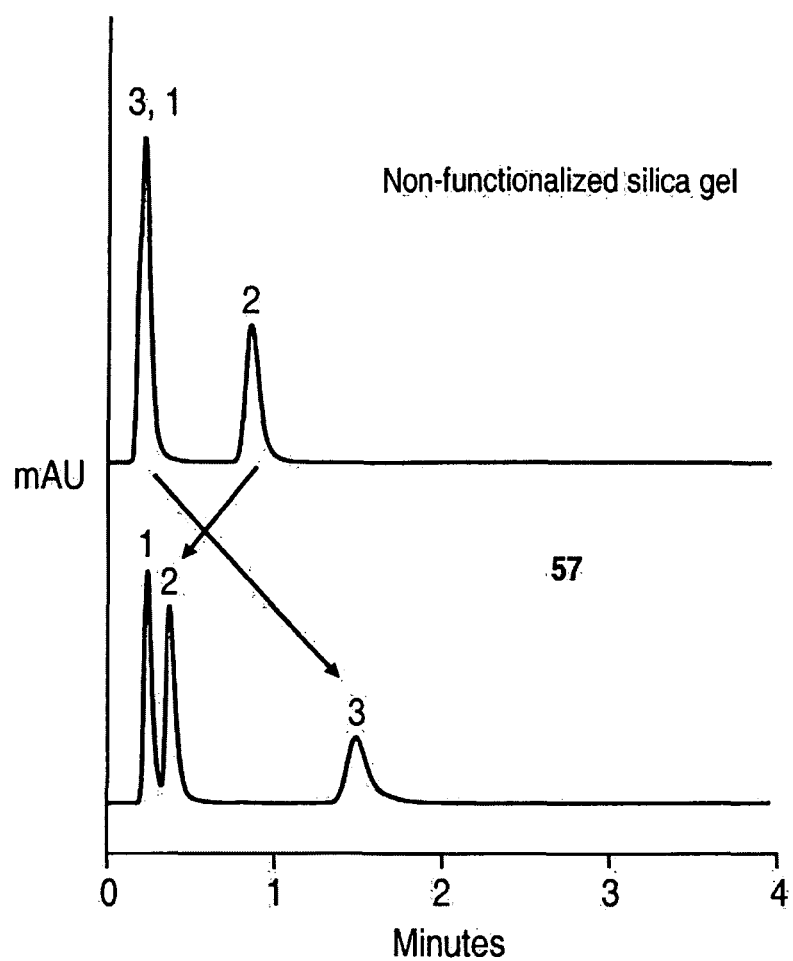
FIG. 8 is a set of two chromatograms illustrating the retention of both cationic and anionic organic compounds on a column packed with composition 57 (e.g., 5 μm, 4.3×10 mm) and comparing the results to those obtained using non-functionalized silica gel. The analyzed sample included naphthalene (1), pseudoephedrine (2) and salicylic acid (3). The conditions were as follows: mobile phase: $CH_3CN$/5 mM NaCl in $H_2O$ v/v 40/60; temperature: 30° C.; flow rate: 1 mL/min; injection volume: 1 μL; detection: UV at 210 nm.

Results for the above analysis are shown in FIG. 8. The figure indicates that mixed-mode material 57 exhibits both anion-exchange (from the aminated latex coating layer) and cation-exchange (from negatively charged silanol groups on the silica surface) properties. The neutral organic molecule naphthalene (compound 1 in FIG. 8) elutes in the void volume due to the absence of hydrophobic functionality. The anionic molecule salicylic acid (compound 3 in FIG. 8) was well retained by composition 57. By comparison, during the analysis of the same test mixture using non-functionalized silica gel (having cation-exchange property due to free silanol groups on the surface) no retention was observed for the neutral molecule (due to lack of hydrophobic retention) as well as the anionic molecule salicylic acid (compound 3 in FIG. 8) due to electrostatic repulsion between the negatively charged silanol groups and the anionic organic molecules.

5.6. Retaining inorganic anion—Iodide (using material 57)

A 4.3×10 mm HPLC column packed with material 57 subject to the following chromatographic evaluation. The test mix contains sodium iodide (300 ppm). The test conditions: gradient, $CH_3CN$/D.I. $H_2O$/0.2 M NaCl aqueous solution/ 0.1% $H_3PO_4$=40/40/10/10 (v/v); flow rate, 1 mL/min; injection volume, 1 µL; temperature, 30° C.; and detection, UV at 210 nm.

Figure 9:
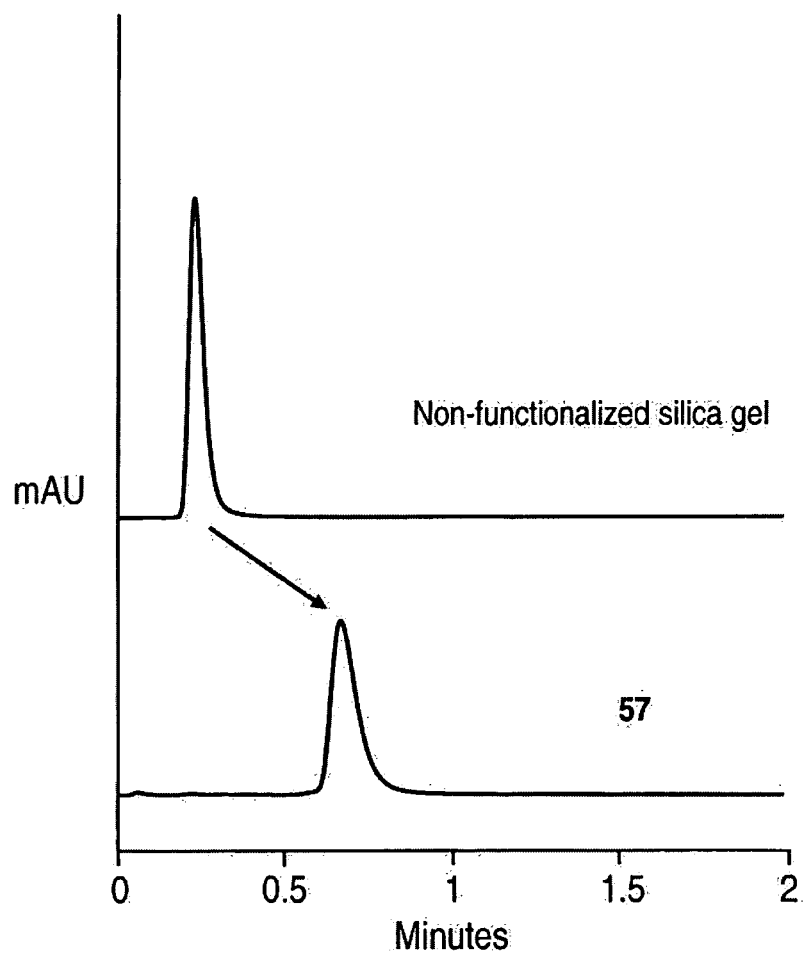
FIG. 9 is a set of two chromatograms comparing the retention of inorganic anions (e.g., iodide, NaI 300 ppm) using columns packed with non-functionalized silica gel and composition 57 (e.g., 5 μm, 4.3×10 mm). The conditions were as follows: mobile phase: $CH_3CN/H_2O$/0.2 M NaCl/0.1% $H_3PO_4$ v/v/v/v 40/40/10/10; temperature: 30° C.; flow rate: 1 mL/min; injection volume: 2 μL; detection: UV at 210 nm.

FIG. 9 indicates that mixed-mode material 57 retains inorganic anion—iodide at the result of the aminated latex coating layer on the silica surface. By comparison, the non-functionalized silica gel shows no retention for iodide ions.

Example 6

Preparation of Monolithic Compositions 6.1. Preparation of Monolithic Silica-based Composition with Reversed-phase/Anion-exchange (Interior) and Cation-exchange (Exterior) Functionalities Purge a solution of silyl ligand (e.g., 9, 5 g in toluene (55 mL)) with a HPLC pump through a silica monolithic column (e.g., Performance Si Column, 4.6×100 mm, Merck KGaA No.: 1.51465.0001), for example, at a flow rate of 0.05 mL/min. During the process, the column can be heated (e.g., in an oven set at 110° C.). After a sufficient reaction time (e.g., 20 h), the column is washed with a solvent (e.g., toluene and acetone) to afford material 60 (the monolithic version of solid support 27). An HPLC pump can be used to wash the column with a buffer (e.g., ammonium acetate buffer, 100 mM, pH 5) at a suitable flow rate (e.g., 0.5 mL/min for 30 min). The column can then be purged with a latex solution (e.g., sulfonated latex particles described in Example 3.2.) at the same flow rate until the latex particles are observed flowing out of the exit of the column. Finally the column can be washed (e.g., with ammonium acetate buffer, 100 mM, pH5; D.I. water and 70% acetonitrile in D.I. water) to give material 61 (the monolithic version of mixed-mode phase 45).

6.2. Preparation of Monolithic Silica-based Composition with Reversed-phase/Cation-exchange (Interior) and Anion-exchange (Exterior) Functionalities A solution of silyl ligand 14 (e.g., 5 g) in a solvent (e.g., toluene, 55 mL) can be purged through a silica monolithic column [e.g., Performance Si Column, 4.6×100 mm, Merck KGaA No.: 1.51465.0001), for example, using a HPLC pump (e.g., at a flow rate of 0.05 mL/min). During the process, the column can be heated (e.g., in an oven set to 110° C.). After a suitable reaction time (e.g., 20 h), the column can be hydrolyzed (e.g., with 0.1% aqueous phosphoric acid solution) for a suitable time (e.g., 3 h) to afford material 62 (the monolithic version of solid support 32). An HPLC pump can then be used to wash the column (e.g., with a phosphate buffer, 0.2 M, pH7, at 0.5 mL/min for 30 min). The column can then be purged with an aminated latex solution (e.g., aminated latex described in Example 3.1.), e.g., at 0.5 mL/min, until the latex particles are observed flowing out the exit of the column. Finally the column can be washed (e.g., with phosphate buffer (0.2 M, pH7), D.I. water, and 70% acetonitrile in D.I. water) to give material 63 (the monolithic version of mixed-mode phase 52).

Example 7

Preparation of Polymeric Resin Supports with Reversed-phase and Various Ion-exchange Capabilities 7.1. Preparation of PS-DVB Polymer-based Compositions with Reversed-phase/Anion-exchange (Interior) and Cation-exchange (Exterior) Functionalities 2-(Dimethylamino)ethanethiol hydrochloride (10 g) can be added to a suspension of PS-DVB Micro-55 resin (10 g) in ethanol (100 mL). 2,2'-Azobis(2-methylpropionitrile) (1.0 g) can be added to the mixture. The mixture can be refluxed gently for 48 hours. The solids can then be filtered off and the resin can be washed with ethanol (e.g., 3×50 mL) and dried under vacuum to get material 64.

10 g of above resin can be dispersed in 100 mL of ammonium acetate buffer (e.g., 100 mM, pH 5). Separately, 100 mL of sulfonated latex (e.g., sulfonated latex described in Example 3.2,) can be adjusted to pH 4-5 (e.g., with ammonium acetate buffer, 2 M, pH 5.4). The above solid support and the above micro-particles can be mixed and stired (e.g., at ambient temperature for 3 h). The functionalized resin beads can be filtered off and washed (e.g., with D.I. water followed by acetone) to afford packing material 65.

7.2. Preparation of PS-DVB Polymer-based Reversed-phase/Cation-exchange (Interior) and Anion-exchange (Exterior) Functionalities Butyl 3-mercaptopropionate (e.g., 10 g) can be added to a suspension of PS-DVB Micro-55 resin (e.g., 10 g) in ethanol (e.g., 100 mL). 2,2'-Azobis(2-methylpropionitrile) (e.g., 1.0 g) can be added to the mixture. The mixture can be refluxed (e.g., for 48 hours). The solids can be filtered off, and the resin can be washed (e.g., with ethanol, 3×50 mL) and dried under vacuum.

A solution of lithium hydroxide (e.g., 1.0 g) in water (e.g., 15 mL) can be added to a suspension of the above resin (e.g., 10 g) in a solvent (e.g., tetrahydrofuran, 50 mL). The mixture can be stirred (e.g., 5 hours). The solids can be filtered off and washed (e.g., with DI-water (3×50 mL), 1 N HCl (3×50 mL), and 1DI-water (3×50 mL)). Polymer beads functionalized with a weak cation-exchange surface can thus be obtained (66).

The above resin (e.g., 10 g) can be dispersed in buffer (e.g., 100 mL phosphate buffer, 200 mM, pH 7). Separately, aminated latex (e.g, amintaed latex described in Example 3.1.) can be adjust to a suitable pH (e.g., pH 6-7 with phosphate buffer, 200 mM, pH 7). The above solid support and the above latex-particles can be mixed and stired (e.g., at ambient temperature for 3 h). The functionalized resin beads can be filtered off and washed (e.g., with D.I. water followed by acetone) to afford packing material 67.

Example 8

Effect of Mobile-phase Ionic Strength on Retention

Figure 11:
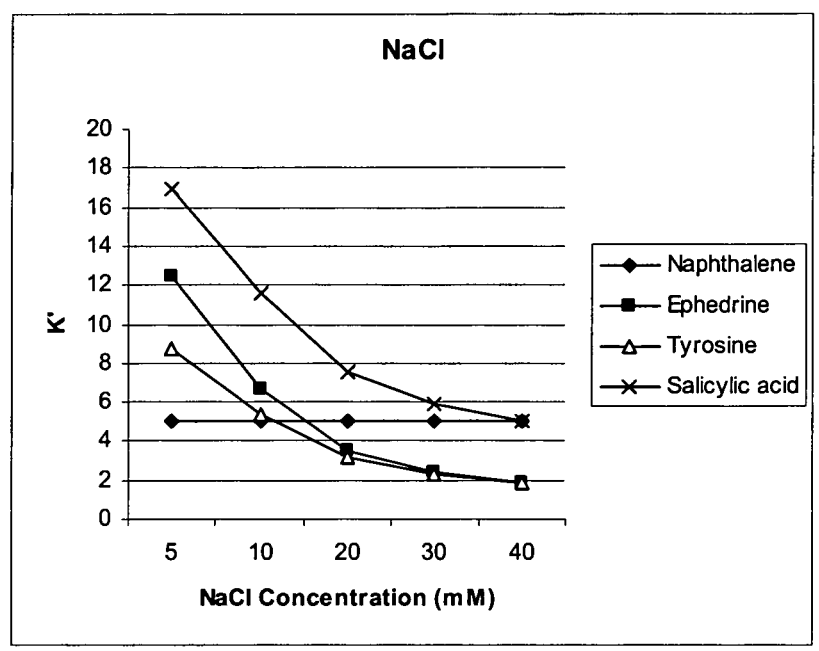
FIG. 11 is a diagram illustrating the effect of the ionic strength of the mobile phase on the retention of various analytes. The experiment employed a column packed with composition 45 (e.g., 5 μm, 4.6×50 mm) and the following conditions. Mobile phase: $CH_3CN/1\%$ $H_3PO_4$/NaCl aqueous solution 5 to 40 mM (total concentration) v/v/v 40/10/50; temperature: 30° C.; flow rate: 1 mL/min; injection volume: 3 μL; detection: UV at 210 nm.

A column packed with composition 45 (5 µm, 4.6×50 mm) was used to analyze naphthalene, ephedrine, tyrosine and salicylic acid using mobile-phases with varying salt concentrations. The conditions were as follows: Mobile phase: $CH_3CN$/1% $H_3PO_4$/NaCl aqueous solution 5 to 40 mM (total concentration) (v/v/v) 40/10/50; temperature: 30° C.; flow rate: 1 mL/min; injection volume: 3 µL; detection: UV at 210 nm. The results, illustrated in FIG. 11, indicate that the ionic strength of the mobile phase affects the retentions of both cationic (e.g., ephedrine) and anionic (e.g., salicylic acid) analytes. Retention of a cation decreases with the increase in competing cations in the mobile phase. Retention of an anion decreases with the increase in competing anions in the mobile phase. Therefore, retentions for both cations and anions decrease with increasing NaCl concentration. Under testing condition (pH 2.2), tyrosine (zwitterionic) is positively charged, and thus behaves like a cation. In this experiment, the ionic strength of the mobile phase had no effect on the retention of a neutral analyte (naphthalene).

Example 9

Effect of Mobile Phase pH on Retention

A column packed with composition 45 (5 µm, 4.6×50 mm) was used to analyze naphthalene, ephedrine, tyrosine and salicylic acid using mobile-phases with varying pH. The conditions were as follows: Mobile phase: $CH_3CN$/sodium phosphate buffer pH 2.3 and 6.5 from 5 to 40 mM (total concentration) (v/v) 40/60; temperature: 30° C.; flow rate: 1 mL/min; injection volume: 3 µL, detection: UV at 210 nm. In this experiment, neutral analytes (e.g., naphthalene) were slightly more retained at pH 6.5 as opposed to pH 2.3, possibly because the weak anion-exchange sites on the stationary phase are less charged and thus more hydrophobic. Ephedrine (cationic) exhibited virtually no retention difference at both pHs since pH change doesn't significantly effect the strong cation-exchange property in the outside-pore areas. By comparison, anionic analytes (e.g., salicylic acid) showed significantly different retention at pH 2.3 and 6.5, possibly due to the fact that, under the testing conditions, the anion concentration is higher at pH 6.5 than at pH 2.3. Tyrosine (zwitterionic) is virtually neutral at pH 6.5 and shows no retention change at different buffer concentrations. At pH 2.3, tyrosine behaves like a typical cation.

Example 10

Effect of Mobile-phase Organic Solvent Content on Retention

Figure 12:
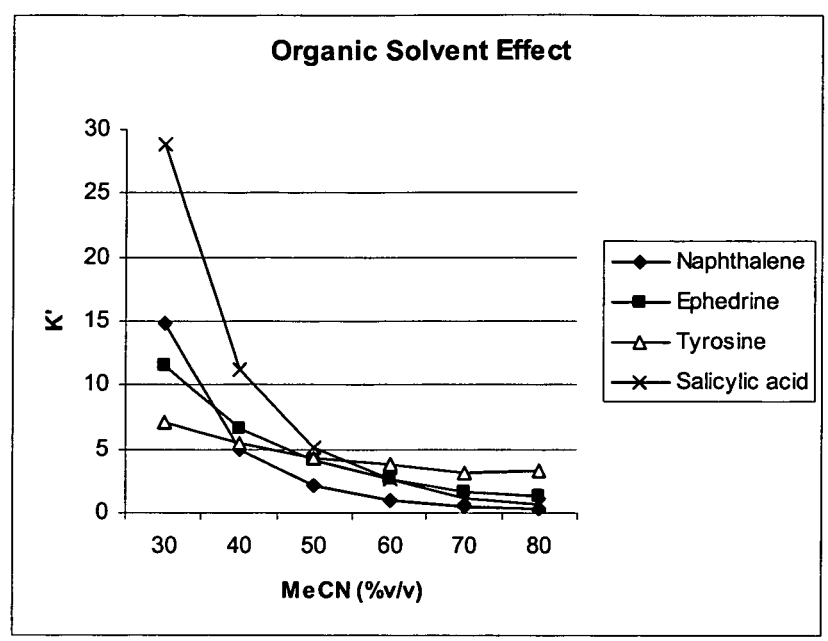
FIG. 12 is a diagram illustrating the effect of the organic-solvent content of the mobile phase on selectivity and retention of various analytes. The experiment employed a column packed with composition 45 (e.g., 5 μm, 4.6×50 mm) and the following conditions. Mobile phase: $CH_3CN$/buffer containing 10 mM NaCl, 0.1% $H_3PO4$ in D.I. water; temperature: 30° C.; flow rate: 1 mL/min; injection volume: 3 μL; detection: UV at 210 nm.

A column packed with composition 45 (5 µm, 4.6×50 mm) was used to analyze naphthalene, ephedrine, tyrosine and salicylic acid using mobile-phases with varying contents of an organic solvent (e.g., acetonitrile). The conditions were as follows: Mobile phase: $CH_3CN$/buffer containing 10 mM NaCl, 0.1% $H_3PO4$ in D.I. water; temperature: 30° C.; flow rate: 1 mL/min; injection volume: 3 µL, detection: UV at 210 nm. The results, illustrated in FIG. 12, indicate that under the test conditions, retention for all types of analytes generally decreases with an increased organic content of the mobile phase. However, the order of elution (selectivity) changes with varying organic solvent content as shown in FIG. 12.

Example 11

Effect of Anion- and Cation-type on Retention

A column packed with composition 45 (5 µm, 4.6×50 mm) was used to analyze naphthalene, ephedrine, tyrosine and salicylic acid using mobile-phases containing different anions (e.g., NaCl versus NaClO$_4$) and different cations (LiCl, NaCl, KCl), respectively. The conditions were as follows: Mobile phase: CH$_3$CN/1% H$_3$PO$_4$/Salt additive 5 to 40 mM (total concentration) (v/v/v) 40/10/50; temperature: 30° C.; flow rate: 1 mL/min; injection volume: 3 µL; detection: UV at 210 nm. The results indicate that the anion type significantly affects the retention of anionic analytes (e.g., salicylic acid). The perchlorate ion is a stronger competing anion than the chloride ion and resulted in lower retention for salicylic acid (anionic) at comparable salt concentrations. On the other hand, the retentions of ephedrine and tyrosine (both are cationic under testing condition) were not affected by the anion type and exhibit overlapping retention curves. Different anion types caused slightly different retentions for naphthalene (neutral).

Similarly, the cation type affected the retention of cationic analytes. The K+ is a stronger competing cation than Na+ ion which is stronger than Li+. Thus the retention for ephedrine follows the order K+<Na+<Li+ at comparable salt concentrations. On the other hand, the retention of salicylic acid (anionic) was not affected by the cation type and exhibited typical anion-exchange behavior. Surprisingly, tyrosine is insensitive to the cation type and under all three conditions, the column gave nearly the same retention curves. Different cations caused approximately the same retention for naphthalene (neutral).

What is claimed is:

1. A multimodal chromatography medium with anion exchange and cation exchange chromatographic capacity, said medium comprising:
   a porous solid support having an exterior surface and interior walls defining interior pores extending to openings in said exterior surface;
   organic ligands covalently bound to said interior walls, said ligands comprising first ion-exchange groups having a first charge, positive or negative; and
   micro-particles comprising second ion-exchange groups having a second charge, wherein said second charge is opposite to said first charge, said micro-particles being bound, directly or indirectly, to said exterior surface of said support, wherein said micro-particles have a first average diameter and said interior pores have a second average diameter, said first average diameter of said micro-particles being larger than said second average diameter of said interior pores, essentially preventing said micro-particles from penetrating into said interior pores, such that said medium has anion exchange and cation exchange chromatographic capacity, said medium having anion exchange, cation exchange and reverse phase chromatographic capacity wherein said ligands comprise an alkyl chain having at least 8 carbon atoms in sequence, such that said alkyl chain provides said medium with reverse phase chromatographic capacity, said interior pores having a volume average diameter of at least about 70 angstroms.

2. The composition of claim 1, wherein said micro-particles are bound to said exterior surface in a mariner allowing liquid flow into said interior pores.

3. The composition of claim 1 wherein said support comprises a flow-through monolith.

4. The composition of claim 1 wherein said support is in particulate form, and wherein multiple support particles are disposed in a packed bed.

5. The composition of claim 1 wherein said support comprises silica, alumina, titania, zirconia, or a combination thereof.

6. The composition of claim 1 wherein said support comprises a silica monolith.

7. The composition of claim 1 wherein said support comprises silica gel.

8. The composition of claim 1, wherein said support comprises a polymeric synthetic organic polymer.

9. The composition of claim 1 wherein said ligands comprise a group, which is a member selected from —Z—OH, —(Z)$_n$N(R$^6$)(R$^7$), —(Z)$_n$N$_+$(R$^6$)(R$^7$)(R$^8$)X$^-$, —(Z)$_n$C(O)OR$^9$, —(Z)$_n$S(O)$_2$OR$^9$, —(Z)$_n$OP(O)(OR$^{10}$)(OR$^{11}$) and —(Z)$_n$B(OR$^{10}$)(OR$^{11}$)(OR$^{12}$),
   wherein
   n is an integer selected from 0 and 1;
   R$^6$, R$^7$ and R$^8$ are members independently selected from H, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl;
   R$^9$ is a member selected from H, a single negative charge and a cationic counterion;
   R$^{10}$ and R$^{11}$ are members independently selected from H, a single negative charge, a cationic counterion, substituted or unsubstituted alkyl, substituted or unsubstituted heteroalkyl, substituted or unsubstituted aryl, substituted or unsubstituted heteroaryl, substituted or unsubstituted cycloalkyl and substituted or unsubstituted heterocycloalkyl;
   X$^-$ is either present or absent, and when present is an anionic counterion; and
   Z is a member selected from substituted or unsubstituted aryl and substituted or unsubstituted heteroaryl.

10. The composition of claim 1, wherein said ligands comprise an alkyl chain of sufficient length to impart reverse phase chromatographic properties to said composition.

11. The composition of claim 1, wherein said micro-particles are bound to said exterior surface by electrostatic forces.

12. The composition of claim 1, wherein said micro-particles are covalently bound to said exterior surface.

13. The composition of claim 1 wherein said micro-particles are bound to said exterior surface by permanent physical entanglement.

14. The composition of claim 1 in a flow-through bed suitable for use as a chromatographic medium.

15. The composition of claim 1 in a flow-through bed.

16. A chromatography column packed with a separation medium comprising a composition of claim 1.

17. A chromatographic method comprising flowing a liquid through a bed of separation medium comprising the composition of claim 1.

18. The chromatographic method of claim 17, wherein said liquid comprises anions, cations and uncharged molecules, each essentially retained by said separation medium.

* * * * *